United States Patent

[15] 3,671,677
Lee, Jr. et al.
[45] June 20, 1972

[54] OUTGOING REGISTER SENDER SYSTEM

[72] Inventors: Ernest O. Lee, Jr.; John A. Adams, Jr., both of Fairport, N.Y.

[73] Assignee: Stromberg-Carlson Corporation, Rochester, N.Y.

[22] Filed: July 23, 1970

[21] Appl. No.: 57,550

[52] U.S. Cl. ....................................179/18 DA, 179/18 EB
[51] Int. Cl. ....................................................H04m 3/38
[58] Field of Search ....................179/18 EB, 18 DA, 27 CB

[56] References Cited

UNITED STATES PATENTS 3,553,382 1/1971 Knox et al. ........................179/18 DA
3,601,546 8/1971 Lee ..................................179/18 EB

*Primary Examiner*—William C. Cooper
*Attorney*—Craig, Antonelli, Stewart & Hill

[57] ABSTRACT

An outgoing register sender system, which is capable of receiving and storing dialed digits for outpulsing to a central office, includes a register sender which may be selectively associated with a central office trunk for the duration of the outpulsing operation, a tone dial converter and a digit analyzer and decoder arrangement to provide toll restriction, the digit analyzer and decoder arrangement being provided on a time share basis so as to be available for use with a plurality of register senders.

57 Claims, 18 Drawing Figures

INVENTORS
ERNEST O. LEE, JR.
JOHN A. ADAMS, JR.

BY Craig, Antonelli, Stewart & Hill
ATTORNEYS

PATENTED JUN 20 1972

3,671,677

SHEET 11 OF 17

OUTGOING REGISTER SENDER SYSTEM

The present invention relates in general to telephone systems, and more particularly to an outgoing register sender PBX system for outpulsing to a central exchange dialed, toned or keyed information from the PBX station user or attendant with associated digit analyzation and restriction, tone or key conversion and other special features.

When a subscriber desires connection to a party outside of his PBX system, it is necessary that the information concerning the location of the called subscriber, as dialed or toned by the calling subscriber, be transmitted via a trunk circuit to the central exchange for further processing in the establishment of the communication connection. For this purpose, the PBX system usually includes outpulsing equipment capable of outpulsing the dialed digits to the central exchange.

In systems which may include both dial equipment and touch-tone equipment, or only touch-tone equipment, which may be associated with a central exchange which is incapable of accepting multifrequency tones due to the nature of the equipment at the exchange or the distance between the PBX and the central office, it is necessary to provide for conversion of the multifrequency tones to dial impulses. In addition, it may be desirable to restrict outgoing trunk calls to the local area of the PBX, or to selected distant areas, or to selected exchanges within selected distant areas. In such case, equipment capable of analyzing the dialed or toned signals and for restricting full outpulsing to the central office of only acceptable calls will be necessary. In addition, other special features such as speed calling, wherein an outgoing trunk call may be established by dialing an abreviated number, require the use of digit analyzing and outpulsing equipment.

In accordance with the present invention there is provided an outgoing register sender system for a PBX, which system is capable of receiving and storing dialed digits for outpulsing to a central office, conversion of multifrequency tones for outpulsing as dial impulses, and analysis of the digits prior to outpulsing for purposes of toll restriction. The system in accordance with the present invention provides for storage of the digits to be outpulsed to the central exchange, which digits can then be analyzed while in storage and prior to outpulsing for purposes of toll restriction and other special features.

The overall register sender system is provided on a time-shared basis and includes a register sender which may be selectively associated with a central office trunk for the duration of the outpulsing operation, a tone dial converter which may be selectively associated with the register sender, and a digit analyzer and decoder arrangement which is associated with the register sender on a time-shared basis, being available for use in association with a plurality of register senders. Thus, an advantageous feature of the present invention is the provision of a plurality of register senders capable of use in association with a central office trunk on a time-shared basis and a single digit analyzer and decoder combination for use on a time-shared basis with the plurality of register senders, which results in a simplification of the required equipment and a great economy in the system.

A further feature of the present invention resides in the provision of a register sender system which is capable of restricting the establishment of a call outside of the PBX system to selected exchanges, selected areas, and selected exchanges in selected areas through analysis and evaluation of the dialed digits. In addition, by evaluation of the dialed digits as received in the register sender, the number of digits to be expected can be determined prior to receipt of all of the digits, permitting release of the register sender from the outgoing trunk circuit immediately upon completion of the outpulsing operation. The result is a greater efficiency in use of the common equipment which is provided on a time-shared basis.

It is an object of the present invention to provide an outgoing register-sender system for providing controlled outpulsing of dialed digits from a PBX to a central office.

It is another object of the present invention to provide an outgoing register-sender system of the type described which is capable of providing tone-dial conversion prior to outpulsing to the central office.

It is a further object of the present invention to provide an outgoing register-sender system of the type described which is capable of providing toll restriction.

It is still another object of the present invention to provide an outgoing register-sender system of the type described wherein outgoing calls from the PBX can be restricted to particular exchanges.

It is a further object of the present invention to provide an outgoing register-sender system of the type described which is capable of restricting outgoing calls from the PBX and/or selected exchanges within selected areas.

It is a further object of the present invention to provide an outgoing register-sender system of the type described which provides for increased efficiency of use of the equipment required through self-determination of the completion of the outpulsing operation performed thereby.

It is still another object of the present invention to provide an outgoing register-sender of the type described wherein time sharing principles are utilized wherever possible in the provision of the equipment necessary for storage, evaluation and outpulsing of the dialed digits to the central office.

These and other objects, features and advantages of the present invention will be more apparent from the following detailed description, when taken in conjunction with the accompanying drawings which illustrate one exemplary embodiment of the present invention, and wherein.

Figure 9:
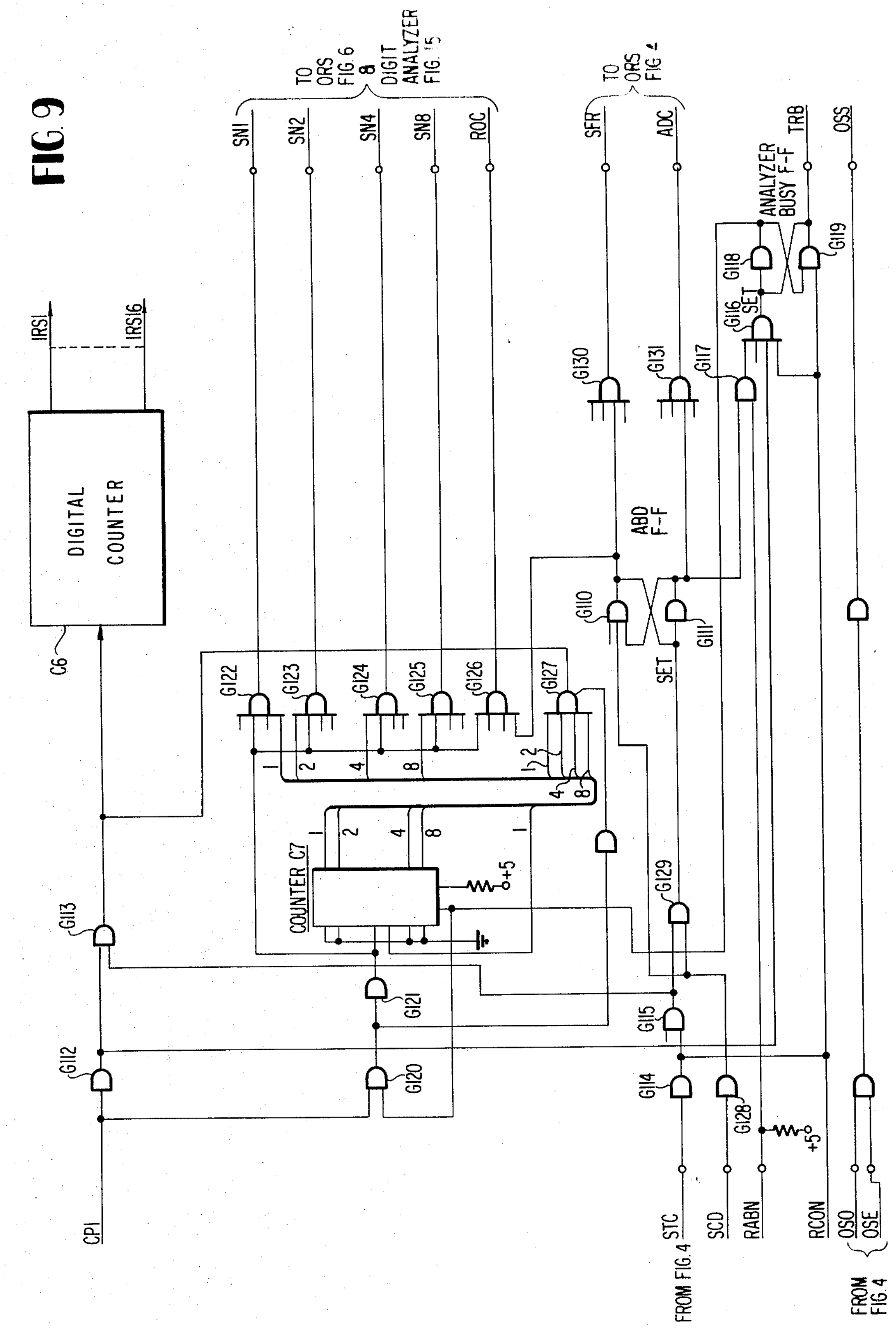
Figure 10:
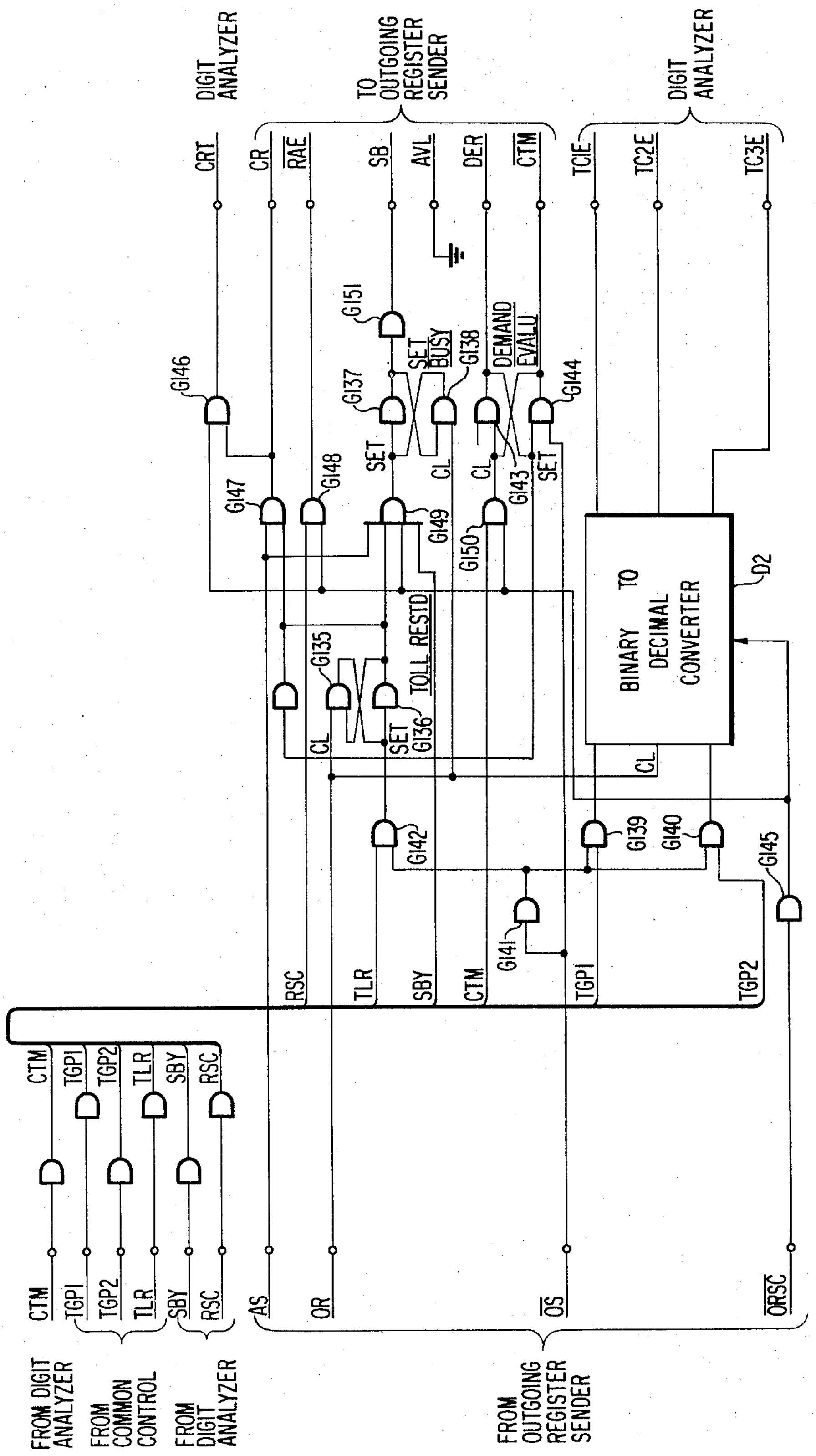
Figure 16:
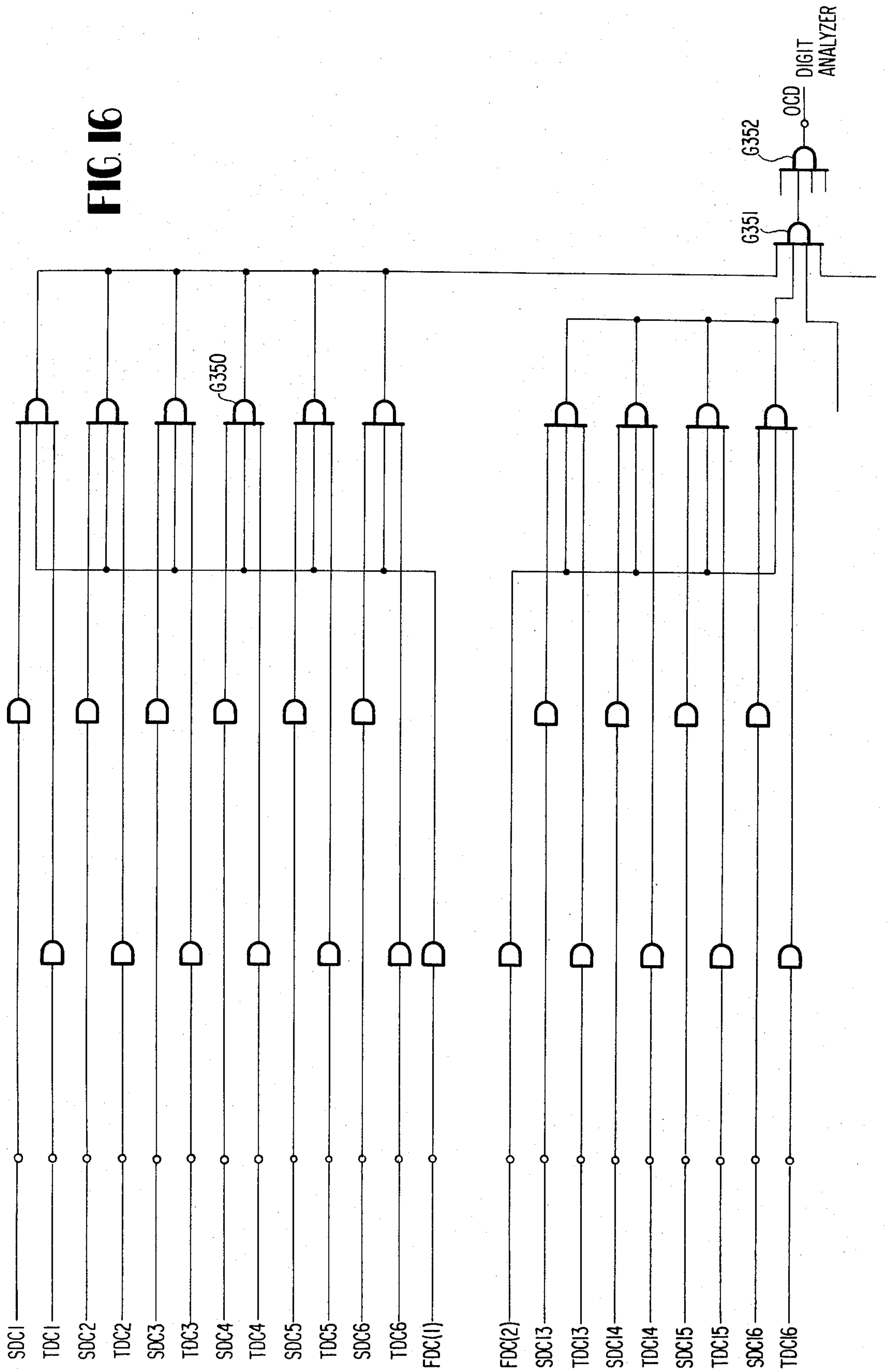

FIGS. 3 through 8 in combination are a schematic circuit diagram of an outgoing register sender;

FIG. 9 is a schematic circuit diagram of the ORS control;

FIG. 10 is a schematic circuit diagram of the restrictor adaptor;

FIGS. 11 through 15 in combination are a schematic circuit diagram of the digit analyzer;

FIG. 16 is a schematic circuit diagram of an office code decoder; and

Figure 17:
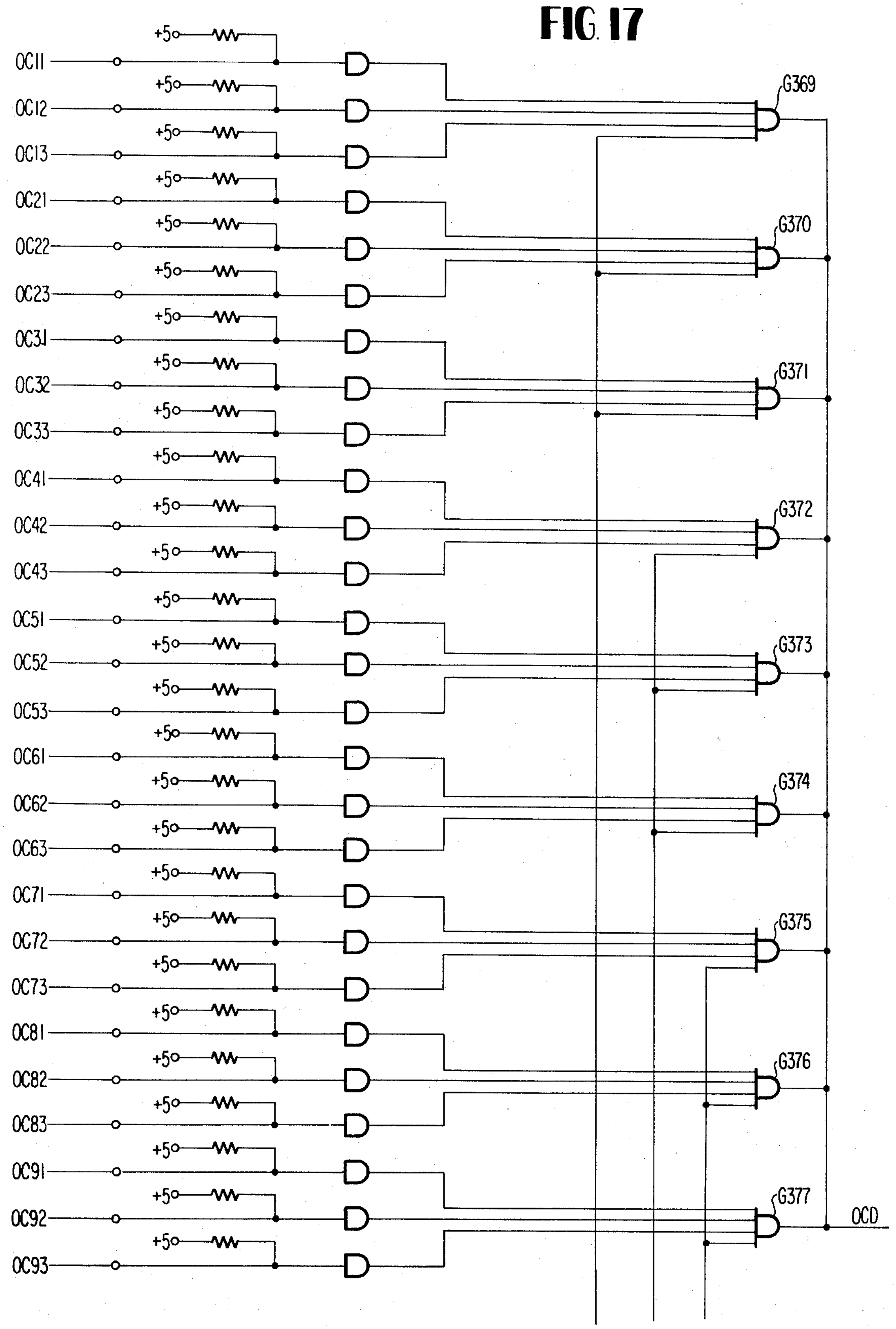
Figure 18:
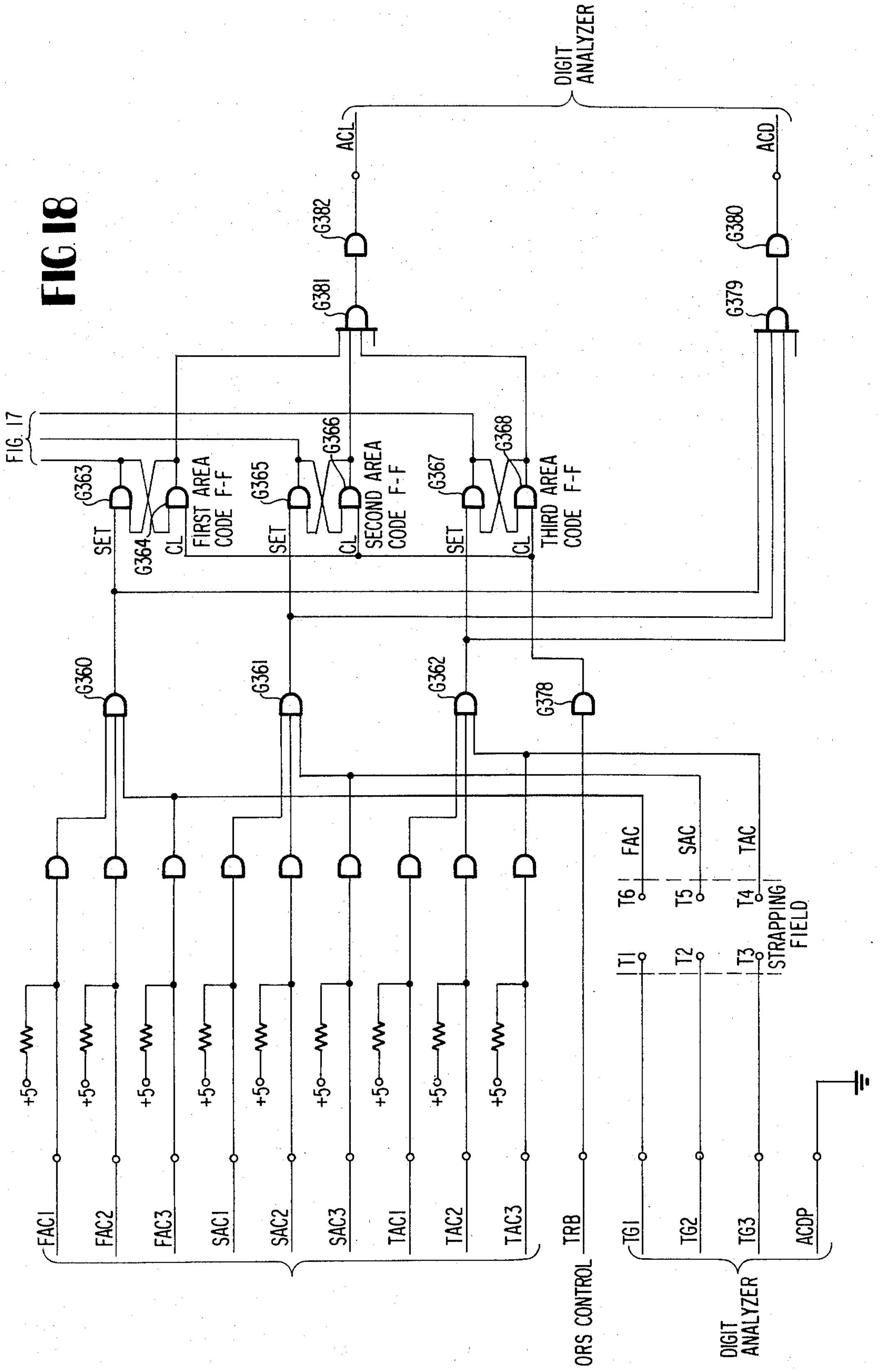

FIGS. 17 and 18 in combination are a schematic circuit diagram of an area code decoder.

The principles of the present invention are described in detail below in association with an exemplary PBX telephone system of the common control type. Since the outgoing register sender system of the present invention is not restricted to use in association with this or any one other particular telephone system, it should be understood that the particular telephone system described herein is presented only for purposes of facilitating an understanding of the basic principles of the invention. Accordingly, only those detailed features of the disclosed common control telephone system which are important to the operation of the register sender system of the present invention have been described in detail.

GENERAL SYSTEM DESCRIPTION

Figure 1:
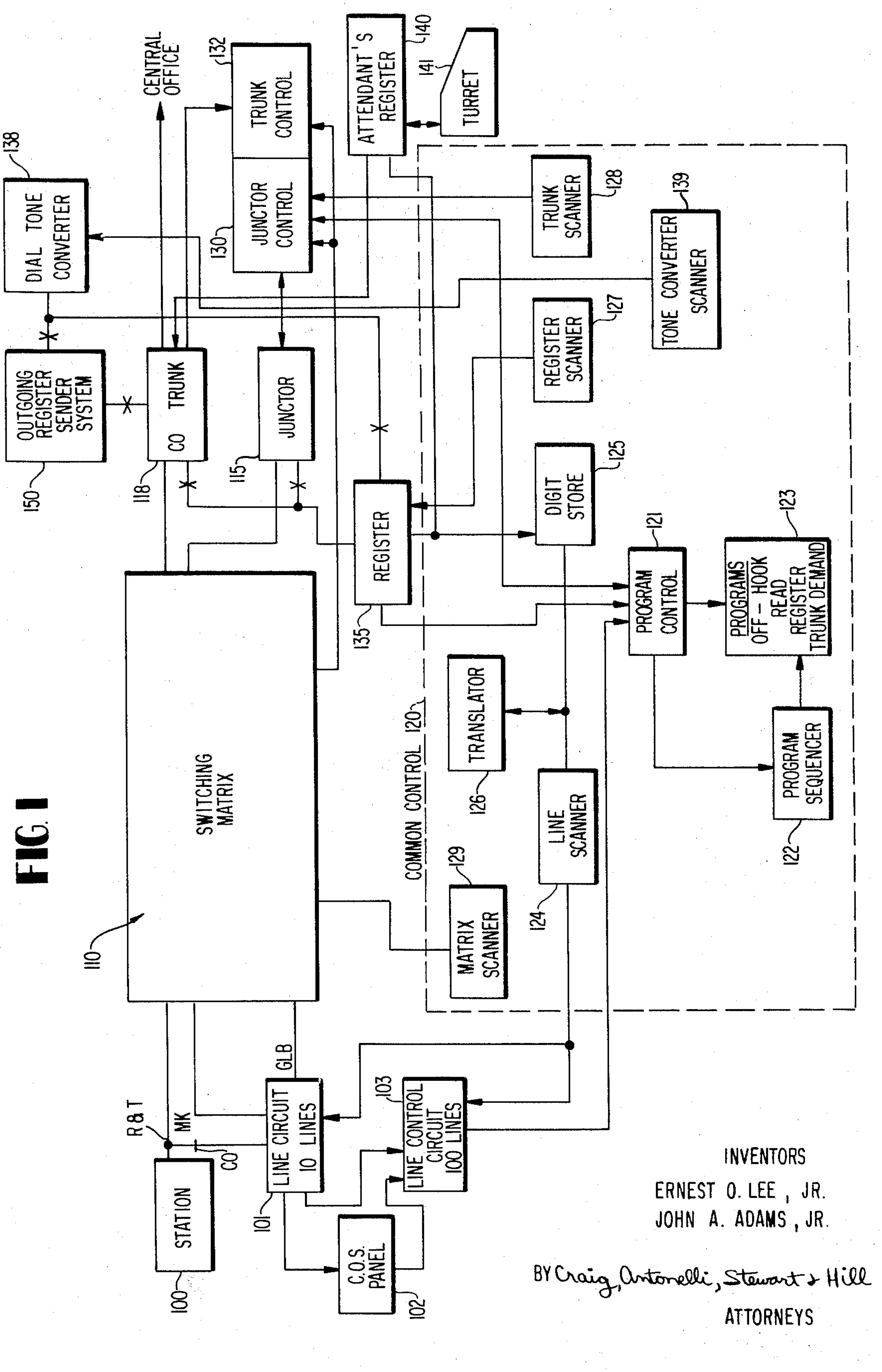
FIG. 1 is a block diagram of a PABX system including the register sender system of the present invention.

FIG. 1 illustrates an overall block diagram of a common control PBX system capable of connecting one station to another station or to the central office via a trunk circuit under control of the common control circuits. The system provides a plurality of stations 100 (of which only a single station is illustrated in FIG. 1 for purposes of simplicity) with each group of 10 stations 100 being serviced by a line circuit 101 associated with a particular input of the switching matrix 110. The switching matrix 110 is a typical matrix network formed of three stages of reed relay switches providing a plurality of paths between a given input connected to one of the plurality of stations 100 and a given output connectable to a junctor 115 or central office trunk 118. All of the switching functions of the system are controlled by the common control circuits 120 which perform the functions for an offhook program, a read register program and a trunk demand program. One or more junctor controls 130 and trunk controls 132 along with a plurality of registers 135 are also provided for purposes of effecting connection of a particular station requiring service to the common control equipment so that the operations necessary to the establishment of a communication connection within the PBX or outside thereof to the central office may be performed. A class of service panel 102 is provided for each group of 100 lines and indicates for the respective stations served by the line circuit special classes of service which are available for the stations and particular equipment which may be available or used thereby, such as tone-dial equipment as opposed to rotary dial.

The common control 120 is divided into several separate functional circuits which serve to control the program of operations carried out to perform the switching processes including the path checking and selection required for connection of a station requesting service to a register or central office trunk. A line control circuit 103 accommodating ten line circuits 101 serves as an interface between the common control 120 and the individual line circuits 101. The common control 120 typically includes a program control 121 which selects the program to be run to satisfy the request for service and a program sequencer 122 and program circuit 123, which implement the program selected by the program control 121. The program 121, program sequencer 122 and program circuit 123 may typically take the form of a wired logic or other programmed system of the type well known in the art. The various control signals eminating from this program control area of the common control 120 have not been illustrated in detail since the arrangement and functioning of such elements do not directly relate to the present invention and such systems are conventionally provided in several forms in the known prior art.

The common control 120 also includes a line scanner 124 which determines the line demanding service on an originating call and identifies and acts as a line marker when terminating a call. A digit store 125 and a translator 126 are also provided as part of the common control 120 and serve the functions normally associated with such elements. A register scanner 127 examines the status of the registers and register senders to determine if an idle register or outgoing register sender is available for use in connection with a calling station or to find the register demanding service to complete a call. A trunk scanner 128 and matrix scanner 129 are associated with the path selecting and checking operation performed in connection with the switching matrix 110, the trunk scanner 128 serving to scan the junctors 115 and central office trunks 118 through the junctor control 130 or trunk control 132 to determine those which may be available to a calling station through the switching station 110. The matrix scanner 129 serves to scan the links in the switching matrix 110 in the process of establishing a path from a given calling station through the switching matrix, in accordance with a system disclosed in copending application Ser. No. 37,772, filed May 15, 1970, in the name of Ernest O. Lee, Jr., and assigned to the same assignee as the present application. This copending application also includes a detailed description and illustration of the switching matrix 110 and the various elements including the junctor control 130 and trunk control 132 along with other elements required for the path finding operation.

In order to provide attendant service in the system, an attendant's register 140 and turret 141 are connected to the central office trunks 118 and registers 135 to provide service for incoming and outgoing calls. Also associated with the central office trunks 118 is an outgoing register sender system 150, as provided in accordance with the present invention.

Typical operation of the system of FIG. 1 is initiated by a subscriber at a given station 100 lifting the hand set of his telephone, which results in the closing of a direct current loop to the tip T and ring R leads of the line thereby signaling the associated line circuit 101 of the demand for service. The demand is placed through the associated line control circuit 103 to the common control 120 for an off-hook program, and the common control causes the line scanner 124 to scan over the lines to identify the particular line requesting service. Upon identifying the line requesting service, a class of service check is made through the COS panel 102 to determine if the line has a rotary dial class of service or a multifrequency class of service, information which is necessary to determine whether a tone dial converter 138 is necessary or not in the establishment of the call.

The common control 120 causes the line circuit 101 to place a negative potential mark on its mark lead, which is connected to an input of the switching matrix 110. The common control 120 then actuates the matrix scanner 129 initiating the path checking and selecting operation which will select a single path through the switching matrix 110 from the station 100 requesting service. The common control also causes the trunk scanner to scan over the junctors, through the junctor control, for an idle junctor, and the register scanner to select an idle register. The cross points of the selected matrix path are operated at this time connecting the calling line through the junctor to the selected register. Dial tone is returned to the calling line from the register through the switching matrix, and at this time, the common control releases and is available to handle other requests for service.

In the case where the subscriber wishes to call outside of the PBX system, after receiving dial tone, the subscriber dials a trunk access code. The dialed code is stored in the register, which upon receiving the trunk access code, places a request for service to the common control. The common control starts the register scanner scanning for the register requesting service, and when the register connected to the particular station from which the access code has been received is found, the stored information is passed from the register to the digit store of the common control. The common control then causes the line scanner to identify the calling line and a class of service check is made to determine if the calling line has a class of service which allows calls to the desired trunk group. At this time, the originating path from the calling line through the switching matrix is released as are the junctor, register, and tone converter (if necessary).

The matrix scanner now scans the matrix for a path to a trunk in the desired group and the trunk scanner scans the trunks in the group looking for an idle trunk which has access to an idle outgoing register sender and a tone converter, if required. The register scanner scans the outgoing register senders. When the trunks, outgoing register sender, and tone converter have been selected, a path is established from the calling line through the stages of the switching matrix 110 to the central office trunk 118. The common control then releases and a second dial tone is returned to the calling line from the central office.

The party now dials a desired toll access and area code and/or central office number or office code, each digit of which is applied through the central office trunk to the outgoing register sender where it is stored. These digits are then examined for toll restriction, which determines whether the code received is valid for the particular station. The analysis of the digits is effected continuously as they are received in the outgoing register sender until a determination can be made that a valid and acceptable number for the particular station involved is being dialed. In this case, the digits are sent from the register sender through the central office trunk circuit to the central office. On the other hand, if it is determined that the code which has been dialed by the subscriber is not acceptable, either because the number is invalid or because that particular subscriber is restricted from calls to the area involved, busy tone is returned to the station 100 and the call is abandoned.

OUTGOING REGISTER SENDER SYSTEM

Figures 2, 8:
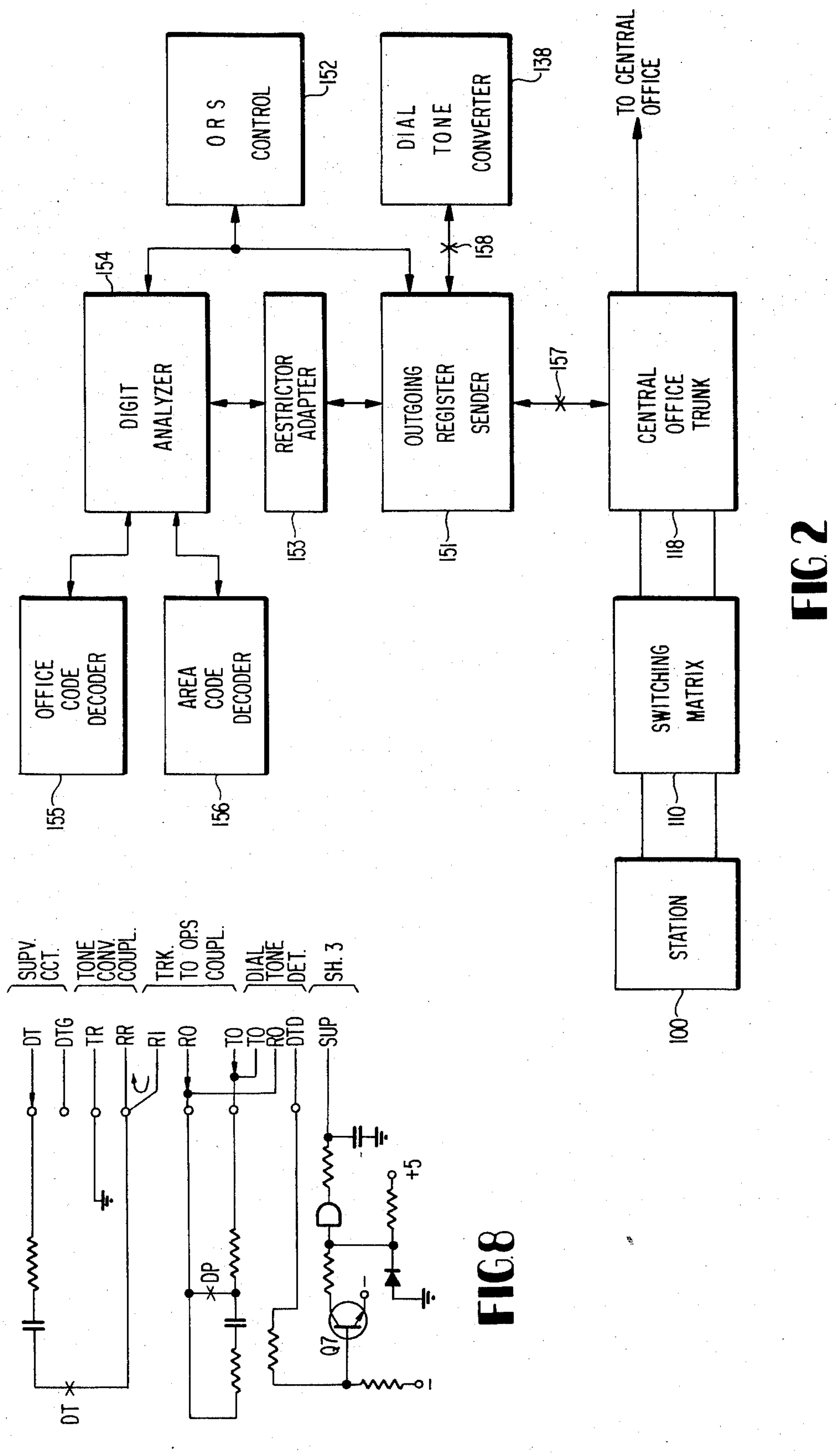
FIG. 2 is a basic block diagram of the register sender system.

A block diagram of the outgoing register sender system of the present invention is illustrated in FIG. 2. An outgoing register sender 151 is connected to a central office trunk 118 through a coupler 157 by the common control 120 when a trunk is allotted for an outgoing call if any of the following functions must be performed:

1. Toll Restriction
2. Tone-Dial Conversion or Conversion of DC Signals From the Attendant
3. Speed Calling (Abbreviated Dialing)

If a calling party's class of service indicates that the line is equipped with a tone-dial phone, the common control 120 will also allot a tone-dial converter 138 which is attached to the outgoing register sender 151 through a coupler 158. Thus, one of the main functions of the outgoing register sender system is to provide for conversion of tone signals or DC signals from multifrequency equipment or from the attendant, respectively.

In the case of speed calling, a three-digit prefix code (for example 6XX) is dialed which indicates the trunk group and desired number. The common control converts this code into the full number to be dialed and transmits this information to the outgoing register sender at the time that it is allotted. Otherwise, the outgoing register sender gets the dialed, toned or keyed information from the PBX station or attendant through the trunk as it is dialed or keyed. In either case, the outgoing register sender converts the digits to dial pulses by way of the tone dial converter 138 and transmits them to the central office. Digital information is supplied to the outgoing register sender in binary form from the tone-dial converter 138, attendant's register 140 or from a speed calling control (not shown) in the common control; however, if the station is provided with a rotary dial, then dial pulses are received directly through the trunk. Thus, the outgoing register sender is required in the case of speed calling in order to provide a means for storing the full set of digits making up the number of the called subscriber, which number is received all at once as a result of the speed calling feature from the common control, to permit outpulsing of the individual digits to the central office with the proper time spacing associated with the normal dialing operation.

Each digit going into the originating register sender is temporarily stored and then transferred into a main memory which can store up to 16 digits. The main memory is provided so that reading out of data therefrom does not destroy the stored information, thereby enabling evaluation of the information for purposes of determining preliminarily the length of the number or for purposes of providing toll restriction. A readin counter is provided in the outgoing register sender to advance with each digit received and a readout counter advances with each digit outpulsed; thus, the outputs of the counters are gated to address the proper position of data within the memory. The readin and readout operations must be separated in time to take care of the possibility that the outgoing register sender may be reading out of the main memory at the time the next digit is received, which is the reason for provisions of the temporary storage of data prior to transfer into the main memory.

After a digit is read into the main memory of the outgoing register sender, the ORS control 152 is requested to attach the digit analyzer 154 to that particular outgoing register sender so that the digit can be analyzed for the purpose of toll restriction or diversion and to determine the length of the expected number. A single digit analyzer 154 is provided for a plurality of outgoing register senders 151 on a time-shared basis the interconnection between the digit analyzer 154 and the outgoing register sender 151 being provided through a restrictor-adaptor 153. Associated with the digit analyzer 154 is an office code decoder 155 and an area code decoder 156 which indicate to the digit analyzer whether the number received by the outgoing register sender 151 forms part of an acceptable office code, an acceptable area code, or an acceptable office code within an acceptable area.

The ORS control marks each position of data in the main memory of the outgoing register sender causing the reading out of each digit in series to the digit analyzer 154. If sufficient information is available in the digits read out to determine whether the call should be allowed or restricted and whether all digits have been dialed, the digit analyzer 154 will so instruct the outgoing register sender 151, and then the ORS control and the digit analyzer will release. If insufficient information is available for the digit analyzer 154 to make a decision, i.e., not all of the digits have been received and analyzed, it instructs the outgoing register sender 151 to "call again" following the next digit received. The digit analyzer 154 will instruct the outgoing register sender 151 when all expected digits have been received. Thus, when all digits in storage have been outpulsed, the outgoing register sender will release from the trunk 118.

If a restricted code is dialed by the subscriber, the digit analyzer 154 will instruct the outgoing register sender to send a signal to the trunk requesting the return of busy tone to the subscriber. The outgoing register sender 151 then releases from the trunk 118 and any remaining digits in the outgoing register sender are not outpulsed. The trunk holds the central office in a seized condition but opens the transmission path. The trunk returns busy tone and code) lead when the calling party hangs up.

Figure 6:
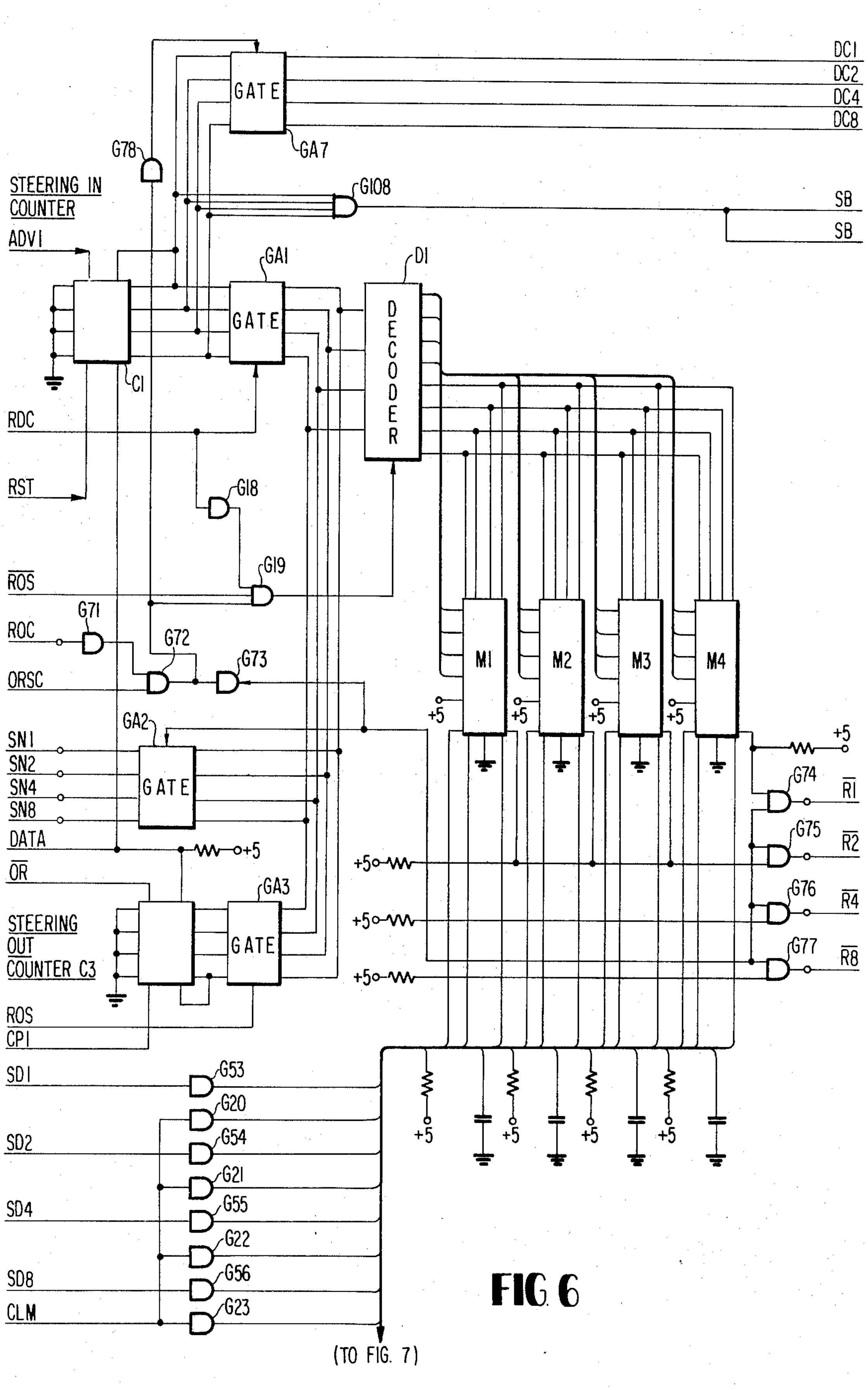

As indicated previously, one of the basic operations performed in the outgoing register sender is the storage of digits which have been dialed and are awaiting outpulsing to the central office. The primary storage function is accomplished by a main memory (as seen in FIG. 6) comprising a combination of flip-flops capable of storing up to 16 digits. In the illustrated example, the main memory is formed of four integrated circuits M1, M2, M3 and M4 each providing 16 flip-flops which are enabled, one at a time, on an X–Y marking principle. The storage areas are wired so that 16 digits may be stored in binary coded decimal form. Both an X input and a Y input must be marked in order to address the associated storage area. Reading out of the memory does not destroy the stored information but merely serves as a means for analyzation thereof. Thus, digits which are individually dialed by the station user are normally stored in the main memory during evaluation thereof to determine that the call which the station user is requesting can be put through. In addition, in the case of a speed call wherein an abbreviated number is dialed by the station user, the main memory serves as the means for accepting and storing the full number of the called party, all of the digits of which are received simultaneously from the speed call decoder, so that these digits may be outpulsed individually in the normal time sequence of dialing.

The outputs of the steering in and steering out counters are connected through a gating arrangement to provide marking of the X–Y address busses. Also, this gating arrangement is controlled by the digit analyzer - ORS control so that the memory may be interrogated by these time shared circuits. Data may not be stored and read out simultaneously, thus these functions are time divided. Since data is often received for storage while a "read out" operation is in process, a temporary (one digit) storage is provided in the outgoing register sender to hold the incoming digit until the read-out function is completed. A four bit counter serves as the temporary storage device and may be advanced by a series of pulses (rotary dial pulses) or may be set directly by DC signals in BCD form. The later form of input is provided in the case when data is received from the speed call store, tone converter or the attendant keys using her key pad. A digit in temporary storage is transferred to the memory as soon after it is received and any read out operation in progress is completed.

The ORS control continuously scans those outgoing register senders in use to determine if digits have been received which require analysis. If a digit has been received by the outgoing register sender since the last analysis, the ORS control scan is stopped and the control steers the read-out of each digit in the memory in sequence to the digit analyzer. The position of the steering in counter is also read out to the analyzer so that it can determine how many digits have been received. After the analysis is completed, the analyzer and control release and the control continues scanning. Prior to releasing, the analyzer signals the outgoing register sender to (1) block the call, (2) release immediately after outpulsing the last digit or (3) request another analysis after receiving the next digit. These alternatives will be discussed in more detail in the detailed description of the digit analyzer.

After an analysis has been made, the outgoing register sender proceeds to outpulse those digits in storage. The steering-out counter addresses the proper storage areas of the memory and the data present is transferred to a four-bit outpulsing counter. This counter is similar to those previously mentioned in that it can be directly set by binary-coded-decimal data and advanced via a trigger. The outpulsing counter is set to the complement of the binary notation in storage and then is advanced to step 15 via the trigger. For example, if the digit 4 (0100) is read out of the main memory, the outpulsing counter is set at the complement of 4 which is 11 (1011). From a common pulse generator the outgoing register senders receive a continuous train of pulses which may be adjusted for 10 or 20 pulses per second. After setting the outpulsing counter, it is synchronized with the leading edge of the ground pulse and advanced by the leading edge of subsequent ground pulses via its trigger input. The counter is thus stepped from the preset position to position 15 (1111). During this period a relay, which maintains a DC loop to the distant switching system, is released during each high pulse, thus the digit stored is transmitted. When the count of 15 is reached the outpulsing counter is stopped and a time delay is begun which imposes a 330-millisecond (or optional 660 m.s.) interdigital pause before the next digit can be read out. At the end of the mandatory delay, the outpulsing counter is cleared and the steering out counter is advanced one step. The outgoing register sender may now attempt to outpulse the next digit which will be addressed properly by the new position of the steering out counter.

If a position addressed in the main memory produces no data to set the outpulsing counter, that position is deemed empty and all digits in storage are considered to have been outpulsed. The steering out counter will not be advanced and no further attempt will be made to outpulse until the outgoing register sender receives another digit and an analysis is made. The outgoing register sender will wait 7 seconds for an addition digit before releasing unless the digit analyzer has already signalled it that all digits expected have in fact been received, at which time the outgoing register sender will release immediately upon encountering the empty state.

At any time when an outgoing register sender is idle, it continuously clears the main memory by addressing each X–Y position in sequence and writing in the binary condition 0 in each storage area. When it is allotted for a call, the clearing process is stopped; thus, at the end of a period of usage, a 2 m.s. artificially busy condition is imposed to insure time for one complete clearing cycle before allowing that outgoing register sender to be allotted again. The steering-in counter is also used to direct the memory addressing for the clearing process, the counter being advanced by a continuous train of pulses from a common source.

OUTGOING REGISTER SENDER

The detailed circuit arrangement of an outgoing register sender and the operation thereof will now be described in connection with FIGS. 3-8. As already indicated, the outgoing register senders are available for connection to a trunk circuit on a time shared basis via a coupler 157 under control from the common control equipment 120. The outgoing register senders also have access to common equipment which is used on a time-shared basis, such as the digit analyzer 154, the office code decoder 155 and area code decoder 156. Access to this common equipment is controlled by the ORS control 152 which continuously scans the plurality of outgoing register senders 151 to detect those which are requesting access to the common equipment. Once the common equipment has performed its job, it releases until access is once again requested thereto by the outgoing register sender.

When the outgoing register sender is idle and available for use, it continuously performs a clearing operation which maintains the main memory free of stored information. The input AS in FIG. 5 will be at ground potential when the attendant register is connected to the trunk associated with the outgoing register sender, indicating that a call is being established by the attendant, but will be high (+5 volts) when the outgoing register sender is idle. Similarly, the input TI will provide a continuous ground when the attendant is connected to the trunk and also serves as an input for dial pulses transmitted from the trunk to the outgoing register sender, but will also be high when the outgoing register sender is idle. Thus, ground potential will be provided at the output of gate G4 to the lead RD, which is applied via gate G5 in FIG. 3 to the input gate of G6, resulting in ground at the output of gate G6 and a high at the output of gate G7 connected to one input of gate G8. The input SCR from the register scanner 127 will be at ground potential when connected to the scanner, but will be high during idle times producing a ground at the output of gate G9. The input ORS will also normally be high unless the register scanner is scanning for an idle outgoing register sender, so that ground will be provided at the output of gate G10 during idle conditions. Thus, the ground at the output of gates G9 and G10 will be applied through gate G11 resulting in a high at the other input of gate G8, and ground will appear on line CLM, which controls the clearing of the memory in FIG. 6. The ground potential applied on line CLM to the gates G20–G23 causes the lines A, B, C and D to the input of the memory to be high so that all of the flip-flops in the memory will be set to the zero state when addressed. A high on input $\overline{WI}$ of each of the integrated circuits M1-M4 when the flip-flop is addressed sets the zero condition therein.

Figure 3:
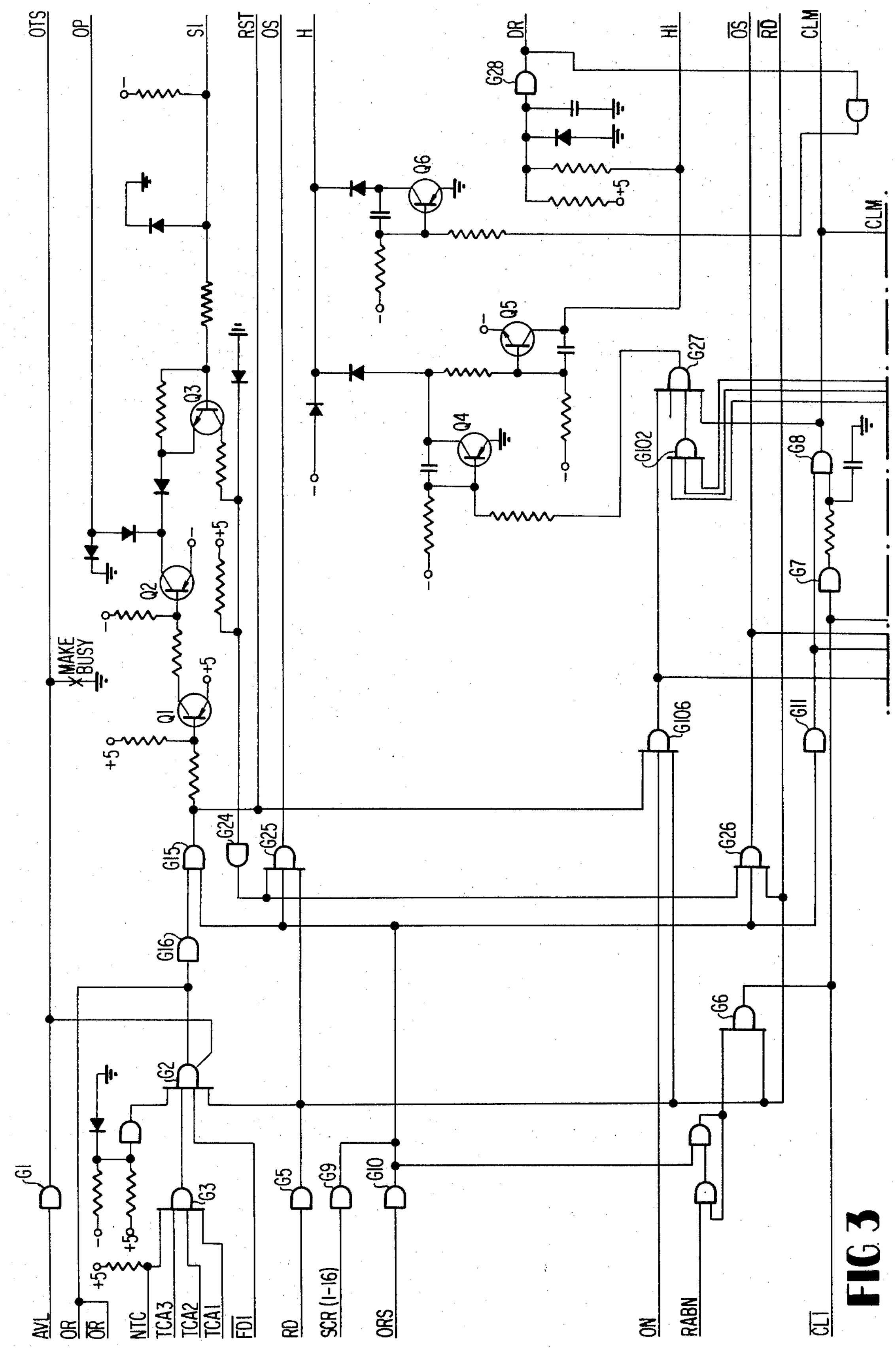
Figure 4:
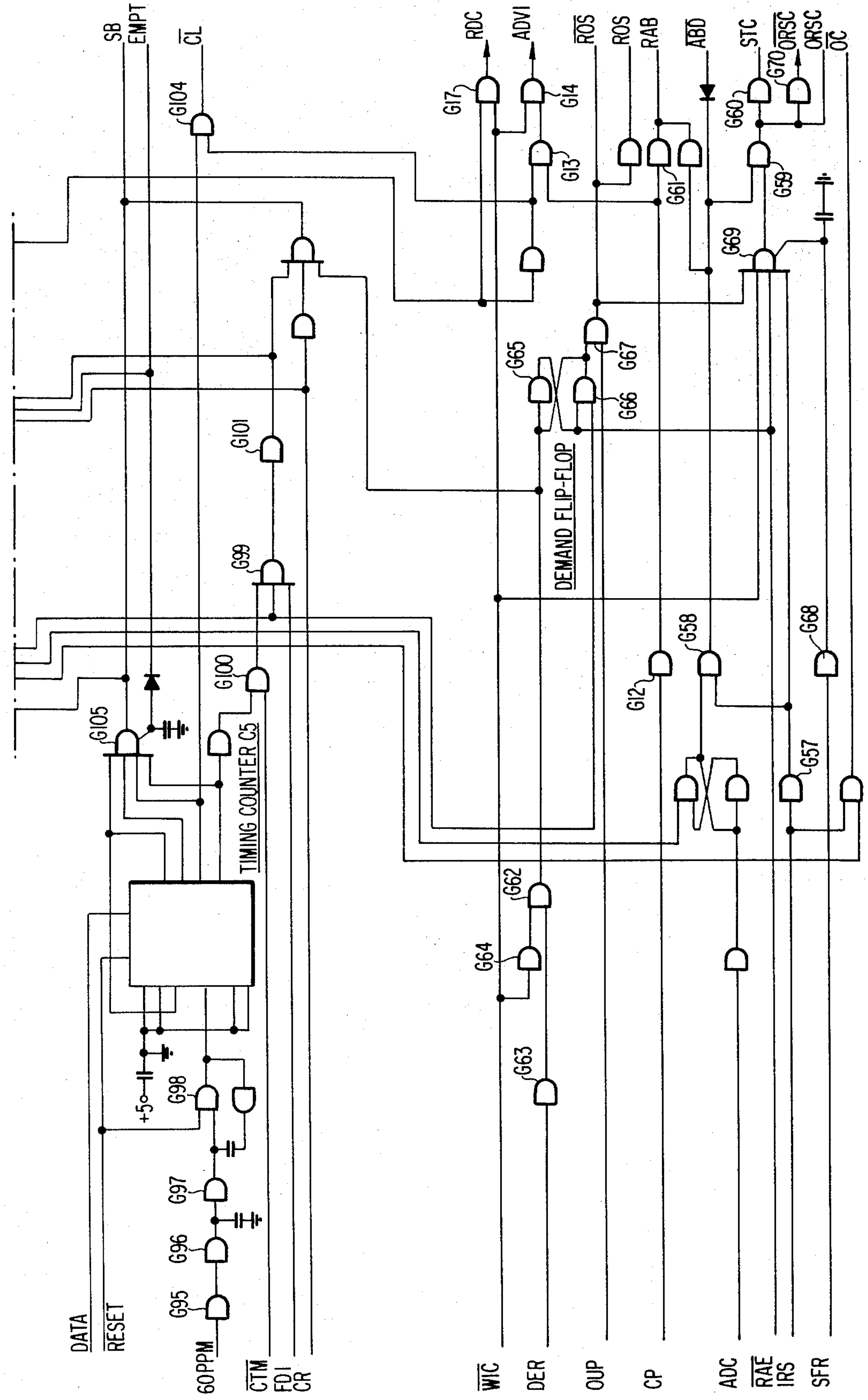

Continuous pulses provided on lead CP in FIG. 4 are applied via gates G12, G13 and G14 to the output ADVI which controls advance of the steering-in counter C1 in FIG. 6. The counter C1 is allowed to advance with application of the pulses thereto since the reset input RST connected to the output of OR gate G15 in FIG. 3 is high, due to the presence of ground potential at the input thereof from gates G9 and G10. The ground potential on the line CLM from the output of gate G8 in FIG. 3 is applied to the input of gate G17 in FIG. 4 producing a high on line RDC to FIG. 6, which directly enables the gate GA1 applying the output of the steering in counter C1 to the decoder D1 and also enables the decoder D1 via gates G18 and G19. Thus, as the pulses are applied to the steering in counter C1 via line ADVI, the binary-coded-decimal output of the counter C1 is applied through the gate GA1 to the decoder D1 where the outputs of the counter are decoded into the proper X–Y marking of the various memory addresses. Thus, the various positions in the memory are sequentially addressed, and at the same time the ground potential provided on line CLM to the gates G20–G23 causes the lines A, B, C and D to the input of the memory to be high so that all of the flip-flops in the memory are set to the "zero" state. The memory is thus continuously cleared when the circuit is idle.

Before an outgoing register sender can be allotted for use in connection with a trunk circuit, a tone dial converter must be available to it, if one is needed, and the register sender must be idle. When a digit analyzer is available, ground is normally provided on line AVL from the restrictor adapter 153, which serves as an interlock indicating that the restrictor adapter is plugged into the outgoing register sender. If a restrictor adapter is not provided, ground may be applied as a wiring option to line AVL. Ground potential applied through gate G1 renders the input to gate G2 high (plus 5 volts). The inputs TCA1, TCA2 and TCA3 from the respective tone-dial converters 138 available to the outgoing register sender apply ground to the inputs to gate G3 when the associated tone converter is available for use. The lead NTC to gate G3 will carry ground potential until it is indicated by the common control that a tone converter is required for the call. Thus, during idle conditions and when ground is received on lead NTC, or as long as a tone-dial converter 138 is available to the outgoing register sender, at least one of the inputs of OR gate G3 will be at ground potential, so that the input to AND gate G2 therefrom will be high. The input $\overline{FDI}$ to AND gate G2 provided from FIG. 7, which indicates that the first digit of a number is not in storage in the main memory, will also be high during idle conditions. As indicated above, the lead RD will be at ground potential when the outgoing register sender is idle, also providing a high at the output of gate G5. Accordingly, with all of the inputs to gate G2 high, ground potential will be applied from the output thereof to the line OR.

Thus, when the outgoing register sender is idle, the output from gate G2 in FIG. 3 will provide ground on the lead OR. In order for the outgoing register sender to be allotted by the common control, ground must be provided on this OR lead since during the allotting process, the common control will scan for a trunk with access to an idle outgoing register sender determined by the condition of the group of OR leads in the trunk control. Thus, if a trunk has at least one grounded OR lead indicating that it can acquire an outgoing register sender, it may be allotted by the common control.

After a trunk is selected, it is marked by positive potential which is extended to the SI lead (FIG. 3) of the outgoing register senders associated therewith. The common control now executes a scanning operation by applying a ground to lead ORS in all of the outgoing register senders of the group and connects ground in sequence to the SCR leads of the respective outgoing register senders. The first outgoing register sender reached which has positive potential on its SI lead (derived through the trunk during the acquisition thereof by the common control) and is available produces a stop scan signal. Since leads ORS and SCR are simultaneously grounded when the particular outgoing register sender is being scanned, the outputs of gates G9 and G10 will render one input of gate G15 high while the other input is also high as a result of the output of gate G16. The resulting ground of the output of gate G15 turns on transistor Q1, which in turn turns on transistors Q2 and Q3, the base drive for the transistor Q3 being the lead SI. With transistor Q3 conducting, a virtual ground is produced on the input of gate G24. At this time, since lines RD, SCR and ORS are grounded, the inputs of gate G25 will be high producing a ground at the output thereof to line OS, which stops the scan for the outgoing register sender. The coupler 157 between the trunk 110 and the outgoing register sender 151 is then operated connecting the two circuits. At the same time, the gate G26, which is connected in parallel with the gate G25, produces a ground on the line $\overline{OS}$ to the restrictor adapter 153 indicating that the outgoing register sender has been seized.

It should be noted from the above operation that the ground applied simultaneously to the gates G9 and G10 from the lines SCR and ORS now produces a high on the output line CLM from the gate G8 which stops the clearing process for the memory. In addition, the ground produced at the output of the gate G15 which turns on the transistor Q1 is also applied to line RST which results in a clearing or resetting of the steering in counter C1. Thus, as soon as the particular outgoing register sender is scanned from the register scanner, the clearing process is terminated and the steering in counter is reset in preparation for the receipt of information to be stored in the main memory.

If a tone-dial converter 138 is required, a scan of the tone converters is executed by the common control at this time. Negative potential on lead OP marks the outgoing register sender through the coupler 158.

Figure 5:
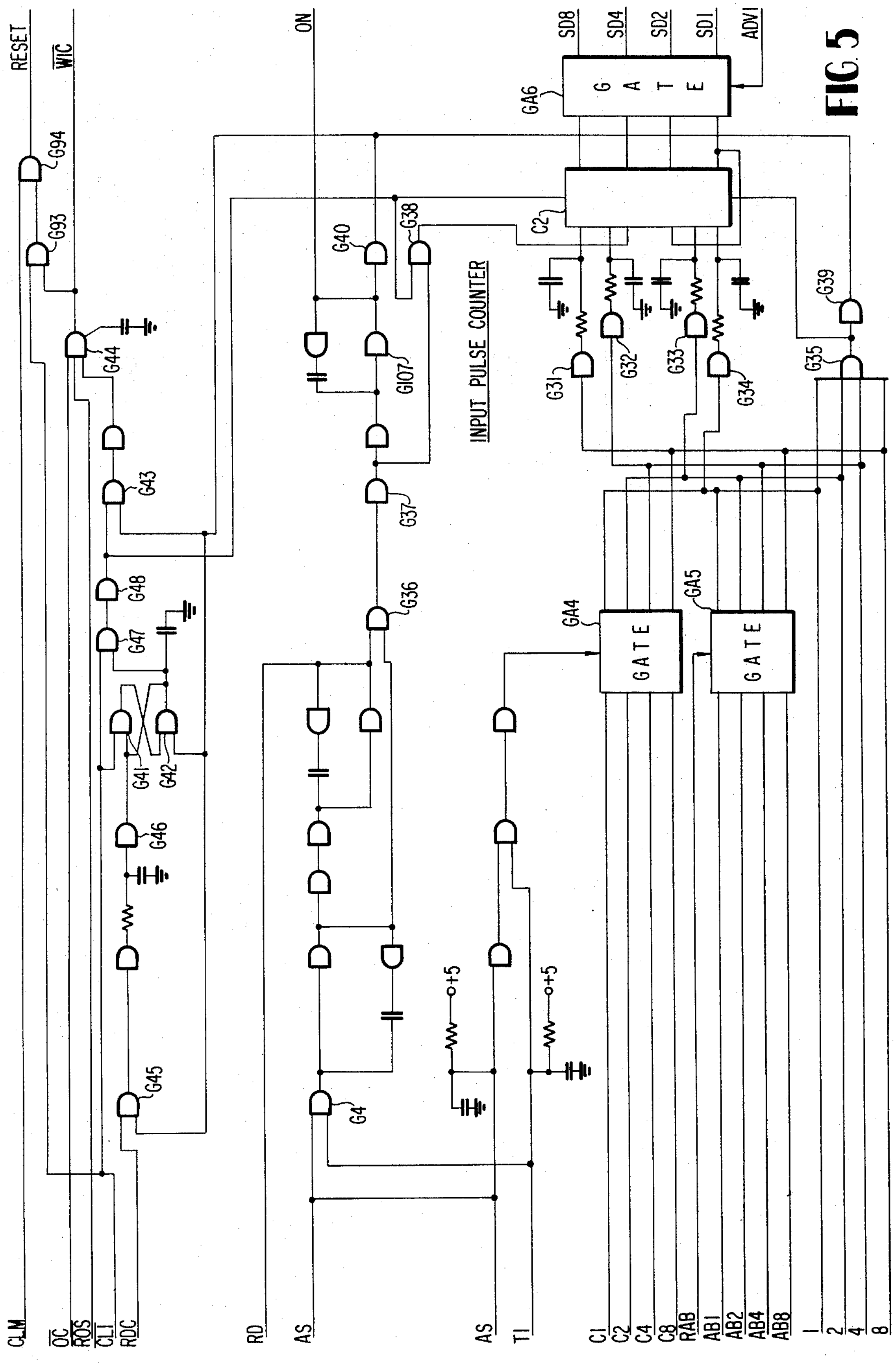

When the coupler relay 157 between the outgoing register sender and the central office trunk operates, ground will appear on lead TI or AS in FIG. 5 which produces a high on lead RD via gate G4, with the result that a high will appear on line $\overline{CLI}$ in FIG. 3 via gates G5 and G6. At the same time ground will be produced on line $\overline{RD}$ to the input of gate G2 in FIG. 3 which makes the outgoing register sender busy and also disables the gate G25 in FIG. 3 to turn off the stop scan signal at the output OS. At this time, the inputs of gate G27 are all high, thus transistors Q4 and Q5 turn on providing ground on lead H to hold the coupler relays 157 and 158 and negative is also provided on lead HI to signal the trunk that the outgoing register sender is attached. Removal of the stop scan signal indicates to the common control that the allotting of the trunk, the outgoing register sender and the tone-dial converter has been completed. The outgoing register sender is now held under control of the TI or AS leads in FIG. 5 and ground is removed from the leads ORS and SCR by the common control. Transistors Q1, Q2, and Q3 are thus turned off.

Figure 7:
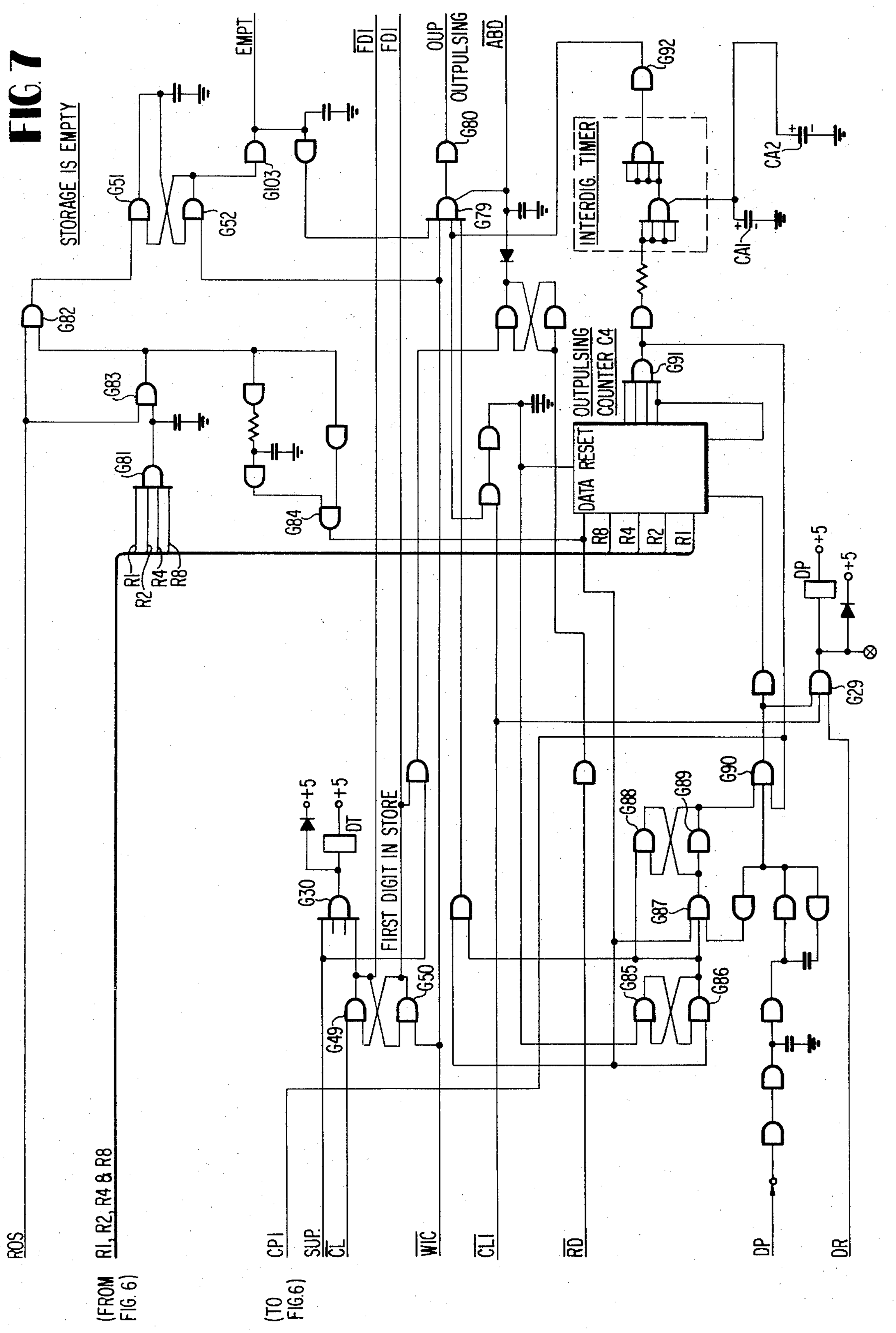

Negative potential on lead HI produces a high on lead DR via gate G28 thus, the inputs of gate G29 in FIG. 7 are all high at this time with the result that relay DP is operated. The operation of relay DP results in the closing of a loop formed by lines RO and TO from the trunk to hold the central office connection. If the central office is arranged for ground start, ground will be received on the tip lead TO in FIG. 8 when the central office is ready to receive dialing. Otherwise a dial tone detector must be associated with this circuit. In either case, when the central office is seized, transistor Q7 is turned on which results in a high on lead SUP to gate G30 in FIG. 7, resulting in operation of the relay DT. The relay DT extends dial tone from the dial tone generator on lead DT in FIG. 8 to the lead R1 extending to the trunk with the result that dial tone is returned through the trunk to the originating party.

The outgoing register sender can obtain the data representing the called party's number (local office or long distance) from four different sources, however, on a given call this information would come from only one of these sources. If the attendant is connected to the trunk and uses her key set to key the called number, the digits are received one at a time in binary coded decimal form on leads C1–C8 in FIG. 5 at the input of gate GA4. On a call originated from a tone-dial phone, the tone signals are routed through the trunk and the outgoing register sender via lead R1 in FIG. 8 to the tone-dial converter 138 on lead RR. The tone converter then converts the tone signals into the binary coded decimal form and presents these signals to the outgoing register sender via leads 1, 2, 4 and 8 in FIG. 5. If a speed call is originated from a station or the attendant, the abbreviated code is translated into the prestrapped local or long distance number by the speed call control (not shown). Each digit is then transferred in sequence to the outgoing register sender in binary coded decimal form via the leads AB1–AB8 in FIG. 5 to the input of gate GA5. The fourth source of dialed information is employed when the call is originated from a station equipped with a rotary dial. In this case, the subscriber dial pulses are detected by the trunk and forwarded to the outgoing register sender in a series of decade base pulses on lead T1 in FIG. 5.

In the first three cases discussed above, each digit is received in binary coded decimal form and is temporarily stored in the input pulse counter C2 of FIG. 5. This counter can be positioned by a series of pulses, as it is in the case of pulses originating from a rotary dial, or it may be directly set via DC input conditions. The binary coded decimal information is applied to the inputs DA–DD of the input pulse counter C2 via gates G31–G34. The inputs to gates G31–G34 are also connected to gate G35 with the result that a ground on any of these inputs will produce a ground at the DATA input to the input pulse counter C2 permitting the counter to recognize any high conditions on the inputs DA–DD. In this way, the counter can be immediately set to the binary coded decimal number. On the other hand, if dialed digits are received via the input T1 through the gate G4, the digits will be shaped and applied via gates G36, G37 and G38 to the CP1 input to the input pulse counter C2 which counts the pulses and converts the digit to binary coded decimal form.

As a digit is received and temporarily stored, a ground pulse is produced by gates G39 or G40 whose outputs are joined to form a wired OR circuit. This ground sets the flip-flop formed by gates G41 and G42 when the input of a digit is completed, the inputs to gate G43 will be high and the resulting ground at the output of this gate produces a high on the input of gate G44. The other two inputs of gate G44 are normally high, thus ground is produced at the output of the gate on line $\overline{WIC}$ which provides the write-in control, and this condition will be maintained as long as the flip-flop formed by gates G41 and G42 is set. The ground produced on run $\overline{WIC}$ is applied in FIG. 4 to the input of gate G17 producing a high on line RDC to FIG. 5, thus the inputs of gate G45 in FIG. 5 are also high at this time so that the flip-flop formed by gates G41 and G42 will be cleared automatically after a delay of approximately 20 microseconds from the output of gate G46. Thus, after a digit is placed into temporary memory in counter C2, a 20-microsecond ground is produced on line $\overline{WIC}$. When the flip-flop formed by gates G41 and G42 is cleared, the input of gate G47 will be at ground potential producing a ground at the output of gate G48 which resets the input pulse counter C2 preparing it to receive the next digit. During the period of the $\overline{WIC}$ ground signal, the digit in the temporary storage is transferred to the main storage in a manner to be described in detail below. If the outgoing register sender is in the process of reading out of its main memory, ground will be provided on run $\overline{OC}$ or $\overline{ROS}$ at the inputs of gate G44; thus, the $\overline{WIC}$ signal will be delayed by the disabling of gate G44 until the readout operation is completed.

Ground on lead $\overline{WIC}$ produces a high on lines RDC via gate G17 in FIG. 4 and on line ADV1 via gate G14, sets the first digit in store flip-flop formed by gates G49 and G50 in FIG. 7 and sets the storage is empty flip-flop formed by gates G51 and G52 in FIG. 7. Ground at the output of gate G49 blocks gate G30 and releases the DT relay cutting off dial tone. In addition, a high on line ADV1 enables gate GA6 in FIG. 5 allowing the digit stored in the input pulse counter C2 to be transferred via lines SD1–SD8 to the write-in WI inputs of the main memory via gates G53–G56. The high on line RDC in FIG. 4 enables the gate GA1 in FIG. 6 which allows the position of the steering in counter C1 to be imposed on the decoder D1, also enabled by the high on line RDC via gates G18 and G19. Thus, the various X–Y positions in the main memory are sequentially enabled. When an X–Y position in the memory is addressed from the output of the decoder D1, those write-in leads SD1–SD8 which are high cause the related flip-flops in the memory to be set thus storing the digit which is in the temporary store formed by the input pulse counter C2. When the $\overline{WIC}$ ground pulse ends, lines RDC and ADV1 return to ground potential. As noted previously, the temporary storage is cleared preparing it to receive the next digit. When ADV1 goes to ground, the steering in counter is advanced one step at input CP1 thereof, thus the next digit received will be stored in a different X–Y position in the memory. Succeeding digits received are stored in the temporary store formed by the input pulse counter C2 and are then transferred to the main memory in a similar manner.

In the case of a speed call, if digits are being supplied by the speed call control, the common control will remain connected to the outgoing register sender until all digits are transferred from the speed call store therein into this circuit. Leads ORS and SCR in FIG. 3 will be grounded during this operation. When the outgoing register sender is required for the speed call, the ORS control is signaled by the common control to scan for the outgoing register sender which has been previously acquired. The ORS control scans the outgoing register senders associated therewith by connecting ground in sequence to the IRS leads (FIG. 4). The ground from line IRS will be applied to gate G57 which provides a high on one input of gate G58, the other input also having a high thereon since the flip-flop formed by gates G and G is set by the ground on line ADC from the ORS control signaling that a speed call is in progress. Thus, a ground will be generated at the output of gate G58 producing a high at the output of gate G59 and a ground at the output of gate G60 on the line STC which stops the ORS control scan. Ground at the output of gate G58 also allows line RAB to respond to pulses from lead CP via gates G12 and G61. The input RAB in FIG. 5 enables the gate GA5 in cadence with the high period of the clock pulse and inputs on leads AB1–AB8 from the speed call control in the common control are recognized during this period and forwarded to the input pulse counter C2. During the period of the readout from the common control, lead RABN in FIG. 3 is grounded to ensure that the line $\overline{CLI}$ will be high to permit read-in of data into the main memory. The binary coded decimal signals received from the common control in sequence are applied to the input pulse counter C2 and forwarded to the main memory in accordance with the normal procedures described above.

When the common control completes the readout of the speed call number the ORS control is signaled to release. Ground is then removed from the leads ORS, SCR, IRS, RABN and ADC, and the outgoing register sender will proceed to process the call.

A digit analyzer 154 may be connected through a restrictor adapter 153 to the outgoing register sender 151 for either or both of two reasons: (1) to determine the number of digits to be expected so that the outgoing register sender can release without a timing period to see if additional digits will be dialed by the originating party, and (2) to provide some form of toll restriction. In either case a restrictor adapter must be associated with each outgoing register sender to provide storage of the calling party's class of service and the trunk group being served if different allowed codes are to be applied to different groups of trunks. Until the digit analyzer is satisfied that the call-in process is acceptable, it will be called following each digit received by the outgoing register sender for analyzation. An exception is on a speed call where all digits are injected into the outgoing register sender during a brief period and the digit analyzer is called only once following the last digit to analyze the entire number.

Ground on lead DER in FIG. 4 from the restrictor adapter indicates that the digit analyzer has not as yet been satisfied that the call in process is acceptable; thus, when line $\overline{WIC}$ is grounded in the process of transferring a digit into the main memory, both of the inputs to gate G62 from gates G63 and G64 will be high producing a ground at the output thereof which sets the demand flip-flop formed by gates G65 and G66. Thus, a high is produced at the output of gate G67 resulting in line $\overline{ROS}$ being high. When the ORS control is idle, it extends ground on lead SFR to gate G68 producing a high at gate G69 and continuously scans the outgoing register senders for a request for connection to the digit analyzer by sequentially placing ground on the lines IRS of these circuits. After the ground signal on line $\overline{WIC}$ is ended, the next time the ORS control grounds lead IRS of this circuit, all of the inputs to gate G69 will be high producing a ground at the input of gate G59, a high at the input of gate G60 and ground on line STC to stop the ORS control scan. The high at the output of gate G59 produces a high on line ORSC and a ground at the output of gate G70 on line $\overline{ORSC}$. This signals the associated restrictor adapter that the digit analyzer is attached.

After receiving the stop scan signal on line STC, the ORS control starts a counter which steers the readout of digits from the outgoing register sender to the digit analyzer. This counter provides binary coded decimal data on leads SN1–SN8 in FIG. 6 to the input of gate GA2 and a ground pulse on lead ROC to actuate the gate GA2 via gates G71, G72 and G73. The output of gate G72 is also applied to gate G19 which enables the decoder D1 so that the output from the gate GA2 will be applied to the decoder where the proper steering signals marking the X–X position in the memory corresponding to the position of the counter in the ORS control are generated. Gates G74–G77 are also enabled from the output of gate G73 so that the digit in storage in the location designated by the numerical designation at the output of gate GA2 is transferred to the digit analyzer via lines $\overline{R1}$–$\overline{R8}$. The output of gate G72 is also applied via gate G78 to enable gate GA7 which forwards the position of the steering in counter C1 to the digit analyzer via lines DC1–DC8. In this way, the digit analyzer can determine how many digits have been received by the outgoing register sender at this time. Thus, when the digit analyzer determines from analyzation of the digits received from the outgoing register sender how many digits can be expected, a comparison of this number with the indication from the outgoing register sender of how many digits have been received at that time make possible a determination as to whether all of the digits to be expected have been or have not been received as yet. This process will be described in greater detail in connection with the digit analyzer.

The ORS control counter advances, addressing a different X–Y position with each advance, thus each digit in storage is read out in order. After each advance of the counter, ground is again connected to lead ROC enabling the readout gates G74–G77. When all digits in storage have been read out or the digit analyzer has evaluated enough digits to determine that the call in process is acceptable, it signals the restrictor adaptor which forwards a ground on line $\overline{RAE}$ to the outgoing register sender. This causes gate G69 to produce a high on the input of gate G57. Thus, gate G60 removes ground from lead STC. This causes the outgoing register sender control and the digit analyzer to release. The ORS control then removes ground from lead IRS and proceeds with its scanning of the other outgoing register senders. Ground on lead $\overline{RAE}$ in FIG. 4 also clears the demand flip-flop formed by gates G65 and G66. If the digit analyzer had determined that the outgoing register sender should expect no further input of digits, the restrictor adapter is signaled to ground lead $\overline{CTM}$ in FIG. 4 indicating that timing should be canceled. Also, if the digit analyzer determines that the call is to be restricted, it signals the restrictor adapter to notify the outgoing register sender that the call is to be marked busy. This operation will be discussed in greater detail below. The digit analyzer is now free to serve another outgoing register sender under the control of the ORS control.

When the first digit is stored in the main memory of the outgoing register sender, the first digit in store flip-flop formed by gates G49 and G50 and the storage is empty flip-flop formed by gates G51 and G52 are set by the ground applied to line $\overline{WIC}$ in FIG. 7. Until the storage is empty flip-flop is cleared, the outgoing register sender will attempt to read out and outpulse the data stored therein; however, two conditions may delay this readout. If a digit is being written into the memory indicated by a ground on lines $\overline{ABD}$ or $\overline{WIC}$, a readout cannot occur since respective inputs from these lines to the gate G79 in FIG. 7 will be at ground potential preventing enabling of the gate. Also, a readout cannot occur if the digit analyzer has not had an opportunity to make an evaluation of the last digit received, indicated by the set condition of the demand flip-flop formed by gates G65 and G66 in FIG. 4. When the storage is empty flip-flop formed by gates G51 and G52 is set and the aforementioned conditions met, all of the inputs of gate G79 will be high producing a high at the output of the gate G80 to the line OUP indicating a request for outpulsing. If the demand flip-flop formed by gates G65 and G66 is not set, the inputs of gate G67 will be high producing a ground on line $\overline{ROS}$ and a high on line ROS. The high on line ROS enables gate GA3 in FIG. 6 permitting the output of the steering out counter C3 to be applied to the input of the decoder D1. The ground on line $\overline{ROS}$ produces a high at the output of gate G19 enabling the decoder D1. Thus, the X–Y positions of the memory are marked corresponding to the position of the steering out counter C3.

If the storage bins addressed have a bit stored, the $\overline{R1}$ output of that memory section will be high so that if a digit is stored in the X–Y position addressed, at least one of the lines R1, R2, R4 and R8 will be ground. Gate G81 in FIG. 7 determines if a digit is stored by providing a high output if a digit is stored and a ground output if the addressed storage bin is empty. It may be recalled that lines ROS and $\overline{ROS}$ initiate the addressing and readout operation. Thus, if there is no digit stored in the X–Y position marked when line ROS is high, then the inputs to gate G82 are high producing a ground at the output thereof which will clear the storage is empty flip-flop formed by gates G51 and G52. This terminates the OUP outpulsing signal which in turn cuts off the ROS signal. This possibility will be discussed in more detail below.

If there is a digit present in the X–Y position addressed, a ground will appear on one of the inputs to gate G81 providing a high at both of the inputs of gate G83 with the resulting ground at the output of this gate blocking the enabling of gate G82 and clearing of the storage is empty flip-flop. This ground at the output of gate G83 also generates a one-half millisecond ground pulse at the output of gate G84 which enables the outpulsing counter C4. The high conditions existing on lines R1–R8 at the DC set inputs of the outpulsing counter C4 cause the counter to be set to the position corresponding to the complement of the digit actually in the memory. The same ground pulse also sets a flip-flop consisting of gates G85 and G86. The supervisory circuit provides continuous pulses on lead DP of approximately 10 pulse per minute rate.

When the ground pulse at the output of gate G84 ends and lead DP becomes ground, the inputs of gate G87 will be high producing a ground at the output thereof which sets a flip-flop consisting of gates G88 and G89. Now, when lead DP becomes high, the inputs of gate G90 will be high and the resulting ground at the output thereof releases the DP relay. Thus, the output of gate G90 follows the DP signal pulsing of the DP relay in cadence with the DP signal. A contact of the DP relay in FIG. 8 repeats the pulsing to the central office by producing loop interruptions. Each time the lead DP returns to ground, the outpulsing counter C4 is advanced one step via the clock input CP1. When the counter reaches position 15 represented by outputs A, B, C and D all being high, the inputs of gate G91 connected thereto will be high resulting in a ground at the output thereof which blocks gate G90 from following the DP signal. Thus, the DP relay remains operated.

The ground at the output of gate G91 also starts the interdigital timer which is controlled by the capacitors CA1 and CA2. Line CP1 advances counter C3; therefore, the next readout attempt is made on a subsequent X–Y position. After the delay, ground from the output of gate G92 connected to the interdigital timer produces ground on line OUP via gates G79 and G80, clears the flip-flop consisting of gates G85 and G86 and resets the outpulsing counter C4. With ground on line OUP applied to gate G67 in FIG. 4, the outputs on lines ROS and $\overline{ROS}$ end, which signals the end of a digit. The digit readout of the main memory has thus been outpulsed in decimal form. When the outpulsing counter C4 is reset, its outputs are reduced to ground potential, thus resetting the interdigital timer which, after a given time delay, results in a high at the output of gate G92. Since the storage is empty flip-flop formed by gates G51 and G52 is still set, the outgoing register sender will attempt to read out and outpulse the next digit in its memory in a similar manner.

There are several circumstances which dictate that the outgoing register sender has completed its function and is to release. The most common of course is when it has outpulsed all digits in its memory and can expect no further dialing from the station user. As discussed above, if a memory position is addressed and it is found to be empty, the storage is empty flip-flop is cleared, indicating that all digits in storage have been outpulsed. If the digit analyzer has previously determined that all digits have been dialed that should be expected, it will have signaled the restrictor adapter to ground lead $\overline{CTM}$ in FIG. 4. When the storage is empty flip-flop is cleared, if ground is on line $\overline{CTM}$, the outgoing register sender will release immediately, otherwise it will wait 7 seconds before releasing. This delay period is to allow the originating party to dial additional digits if desired.

Each time a digit is written into the outgoing register sender memory, a ground pulse is provided on line $\overline{WIC}$, as indicated above. This places ground on line RESET in FIG. 5 via gates G93 and G94, which clears the timing counter C5 in FIG. 4. After the digit is written into the memory, the line $\overline{WIC}$ becomes high and the line RESET also becomes high. This allows pulses from the 60 PPM line to step the timing counter C5 via gates G96, G97 and G98. After seven seconds, the output D of the counter C5 becomes high or ground from lead $\overline{CTM}$ produces a high on the input of gate G99 via gate G100. The other inputs of the gate G99 are high at this time so that the output of gate G101 places a high at the input of gate G102 (FIG. 3). If the storage is empty flip-flop is cleared, line EMPT at the output of gate G103 in FIG. 7 will be high rendering another input of gate G102 in FIG. 3 high. The input to gate G102 from line CR will also be high at this time so that the resulting high at the output of gate G27 turns off transistor Q4, which in turn turns off transistor Q5. This removes negative potential from the lead H1 which reduces the line DR to ground potential releasing the DP relay and turning off transistor Q6. Thus ground is removed from lead H which releases the couplers between the outgoing register sender and the trunk and between the outgoing register sender and the tone-dial converter. When the outgoing register sender to trunk coupler 157 releases, leads AS and TI in FIG. 5 are opened, thus lead RD goes to ground potential after a delay of 150 milliseconds.

The ground on line RD results in a ground on line $\overline{CLI}$ which produces a delayed ground on line CLM at the output of gate G8 in FIG. 3. Until the line CLM becomes ground, a ground pulse is produced on line RESET which clears the timing counter C5. When the ground appears on line CLM, the line RESET once again becomes high allowing the timing counter to start again and this ground also clears the memory by enabling gates G20 through G23 as previously indicated. After approximately two seconds, output C of the timing counter C5 becomes high producing a ground at the output of gate G104 on the line $\overline{CL}$. This clears the first digit in store flip-flop formed by gates G49 and G50 in FIG. 7, which in turn removes ground from line $\overline{FDI}$ allowing ground to return at the output of gate G2 in FIG. 3 on line OR indicating that the outgoing register sender is idle. Ground remains on line CLM clearing the scratch pad memory continuously until the next seizure of the outgoing register sender.

If the digit analyzer determines at any time that the call is to be restricted, it signals the restrictor adapter to ground lead SB in FIG. 4. This signals the trunk through the coupler to block the call and return busy tone. It also signals the outgoing register sender to release. Ground on line SB produces a high at the output of gate G27 in FIG. 3 turning off the transistor Q4 and this circuit releases in a similar manner as described above.

When the outgoing register sender circuit is initially seized, ground is removed from the line CLM producing a ground pulse on line RESET at the output of gate G94 in FIG. 5 which clears the timing counter; however, after ground is received on leads T1 or AS and line $\overline{CLI}$ becomes high, inputs to gate G93 in FIG. 5 are both high with the result that the output of gate G94 becomes high starting the timing counter C5 in FIG. 4. If a digit is received by the outgoing register sender, ground on line $\overline{WIC}$ will reset the counter via line RESET through gates G93 and G94; however, if no digits are received, the counter will continue to count for approximately fifteen seconds. When the count of fifteen is reached (all inputs high) ground from the output of gate G105 on line SB will signal the trunk to block the call and return busy tone. This ground also initiates release of the outgoing register sender as previously described.

Gate G106 in FIG. 3, having inputs connected to the line ON, the output of gate G5 and the output of gate G15, is provided to force release of the outgoing register sender and provide an output on line SB to the trunk if the originating party hangs up while the outgoing register sender is still connected to the trunk. In this case, ground is removed from the lead TI and after a delay line RD goes to ground potential. Line ON connected to the output of gate G107 in FIG. 5 is high at this time so that all of the inputs to the gate G106 in FIG. 3 are high producing a ground at the output thereof which is applied directly to the line SB to release the outgoing register sender and the couplers as previously described.

Also, if more than fourteen digits are dialed into the outgoing register sender, all outputs of the steering in counter C1 in FIG. 6 will be high producing a ground at the output of gate G108 on lead SB. Release of the outgoing register sender and the couplers is effected in response thereto as previously described.

ORS CONTROL

Features attributed to the outgoing register sender are in general derived by the use of common equipment which can be provided as required. For example, to provide "speed calling" a common speed call store is provided. If some form of toll restriction is desired the digit analyzer is provided with addition decoding being equipped as required. Regardless of what common equipment is provided to add versatility to the outgoing register sender that equipment is shared by all register senders on a time shared basis. An outgoing register sender is connected to the common equipment by enabling gates in a selected register sender which allow information to be transferred to and from that register sender and the common equipment, as described. Selecting the register sender to be served is the prime function of the ORS control. This circuit consists of a scanner, which is stopped to enable a selected register sender, and a four-bit counter which steers the read out of digits from the register sender to the digit analyzer, or, in the case of speed call, the read in of digits from the speed call store to a register sender.

The circuit configuration of the ORS control is illustrated in FIG. 9. This control circuit is provided in conjunction with a plurality of outgoing register senders, for example 16, and basically consists of two counters. The outputs of a digital counter C6 are gated to form 16 leads IRS1–IRS16 which identify each of the outgoing register senders. This counter runs continuously searching for an outgoing register sender which has a digit to be analyzed. When such an outgoing register sender is found, the digital counter C6 is stopped and a second counter C7 is started. The outputs of the second counter C7 are gated to address each X–Y position in the memory of the attached outgoing register sender. This counter also signals the digit analyzer as to which digit is being read in.

The ABD flip-flop formed by gates G110 and G111 is normally cleared, thus lead SFR is grounded indicating to the outgoing register senders that the ORS control is searching for an outgoing register sender which requires connection to the digit analyzer. Clock pulses on lead CP1 advance the digital counter C6 via gates G112 and G113 providing ground pulses in sequence on leads IRS1-IRS16 in the respective outgoing register senders. As indicated above in connection with the operation of the outgoing register sender, when ground is connected to the IRS lead of a register sender which needs the services of the digit analyzer, ground will be returned on lead STC. This ground signal connected to the input of gate G114 provides a high at the input of gate G115 and a ground at the input to gate G113 preventing further clock pulses from being applied to the digital counter C6. Thus, ground remains on the lead IRS extending to the outgoing register sender which has returned a signal on line STC.

The line RABN is grounded by the common control when an abbreviated number is to be read in. Thus, if line RABN is high, the next ground pulse on lead CP1 will produce a high at the output of gate G112 to the input of gate G116. With the ABD flip-flop cleared, a high is provided at the output of gate G117 so that all of the inputs to the gate G116 are high setting the analyzer busy flip-flop formed by gates G118 and G119. This removes ground from the clear lead to the reset input of the counter C7, which will now be advanced by subsequent pulses on the lead CPI via gates G120 and G121.

The counter C7, which can count up to 16, provides a binary coded decimal readout on leads SN1–SN8 to the outgoing register sender (FIG. 6) plus ground pulses on lead ROC via the gates G122–G126. These pulses on lead ROC follow each advance by the counter coordinating the sequential readout of each digit in the storage of the outgoing register sender to the digit analyzer. The analyzer inspects each digit as received and if the analyzer receives enough digits to satisfy the conditions of an allowed call, the analyzer connects ground to the lead RSC. Ground removed from lead STC causes the input to gate G113 to be high, thus the next ground pulse on the lead CPI will pass the gates G112 and G113 to advance the digital counter C6 to once again begin the scan of the other outgoing register senders. Thus, as soon as the digit analyzer determines that the call is acceptable, the ORS control circuit will immediately switch its attention to the other outgoing register senders. Otherwise, when the counter C7 reaches the count of 15, all inputs of gate G127 will be high and the ground produced at the output of this gate will directly advance the digital counter C6. In either case, when the digital counter C6 advances, ground is removed from the IRS lead to the outgoing register sender; thus, resulting in the removal of ground from the lead STC therefrom to the ORS control.

Removal of ground from lead STC also clears the analyzer busy flip-flop formed by gates G118 and G119 restoring the ORS control to its normal condition and the digital counter C6 then continues to advance searching for another outgoing register sender which requires the service of the digit analyzer. The analyzer busy flip-flop having been cleared, ground is applied to the reset input of the counter C7 clearing the counter and preventing it from stepping further.

When the speed call control in the common control receives an indication that a speed call code has been dialed, ground is connected to the lead SCD in the ORS control. The common control connects a trunk to the calling line and then executes a register scan to connect an available outgoing register sender to the assigned trunk in the manner described above. When the ORS control is free, that is, not connected to an outgoing register sender, lead STC is high and the ground on lead SCD will set the ABD flip-flop via gates G128 and G129. Thus, if the ORS control is involved with the readout of an outgoing register sender to the digit analyzer when the lead SCD is first grounded, the ORS control will complete that program and release from that outgoing register sender before setting the ABD flip-flop.

The setting of the ABD flip-flop removes ground from the lead SFR and the output of gate G130 and grounds the lead ADC at the output of gate G131 with no ground on lead STC, the digital counter C6 is advanced by pulses on the lead CPI. When ground is connected to the IRS lead of the outgoing register sender which has been selected in the register scan mentioned above, ground will be returned by that outgoing register sender on lead STC. The digital counter C6 will thus be stopped and the ORS control is attached to the outgoing register sender being used for the speed call. When the speed call control is ready to transmit the called number to the outgoing register sender, ground is connected to the lead RABN in the ORS control and in the outgoing register sender. When the next ground pulse is received on lead CPI it is applied to the input of gate G116 as a high from the output of gate G112 producing a ground at the output of this gate setting the analyzer busy flip-flop. The counter C7 is now advanced and provides binary coded decimal signals on leads SN1-SN8 to coordinate the readout on each digit in sequence from the common control to the outgoing register sender. When counter C7 reaches the count of 15, the output of gates G127 becomes ground and advances the digital counter C6. Ground is thus removed from the IRS lead which results in ground being removed from the lead STC. This produces ground on the output of gate G114 clearing the analyzer busy flip-flop and ground is removed from the lead SCD by the common control clearing the ABD flip-flop and restoring the ORS control to normal.

RESTRICTOR ADAPTER

FIG. 10 illustrates a typical restrictor adapter, which provides the interconnection between an outgoing register sender and a digit analyzer. Each outgoing register sender has one restrictor adapter associated permanently therewith for purpose of storing signals relating to the outgoing register sender to digit analyzer operation. When the associated outgoing register sender is idle, as previously indicated, ground is present on the lead OR (FIG. 3) therein which is applied to the restrictor adapter and serves to clear the toll restricted flip-flop formed by gates G135 and G136, the set busy flip-flop formed by gates G137 and G138 and the binary to decimal converter D2.

When an outgoing register sender is allotted in connection with a central office trunk 118 by the common control, ground is removed from the lead OR, as already described, and a ground pulse is provided on lead $\overline{OS}$ (FIG. 3) which enables gates G139 and G140 via gate G141 to pass signals present on leads TGP1 and TGP2, depending upon whether the first trunk group is being served or the second trunk group is being served, to the binary to decimal converter B2. At the same time, gate G142 is enabled from the output of gate G141 connecting line TLR to the toll restricted flip-flop formed by gates G135 and G136. If toll restriction is to be applied as determined by the calling party's class of service designated in the class of service panel 102 (FIG. 1), ground on lead TLR produces a ground at the output of gate G142 which sets the toll restricted flip-flop. Ground on lead TGP1 indicates that the trunk being allotted is of the first trunk group and the ground on lead TGP2 indicates that the trunk being served is of the second trunk group. If a third trunk group is being served, ground will be provided on leads TGP1 and TGP2. The purpose of identifying the trunk group is that a different pattern of toll restriction may apply to different trunk groups, i.e., trunks to different destinations. Thus, depending upon which trunk group is being served as determined by the inputs to the binary to decimal converter D2, one of the outputs TC1, TC2 or TC3 to the digit analyzer will be enabled.

Since the demand evaluation flip-flop formed by gates G143 and G144 is initially cleared, ground on lead DER to FIG. 4 signals the outgoing register sender to request an evaluation when it receives the first digit by setting the demand flip-flop formed by gates G65 and G66 therein. The ORS control continuously scans for an outgoing register sender requiring an evaluation, and when one is found, the control stops on that circuit. Ground on lead $\overline{ORSC}$ from FIG. 4 indicates that the ORS control has connected to the outgoing register sender associated with the restrictor adapter. Ground on lead $\overline{ORSC}$ enables the binary to decimal converter via gate G145 thereby signaling the digit analyzer via lines TC1, TC2 or TC3 which trunk group is being served. Also, a gate G146 is enabled from the output of gate G145 which signals the digit analyzer via the lead CRT whether or not a toll restriction check is to be made. For example, ground on lead AS from the outgoing register sender (FIG. 5) indicates that the attendant is connected to the trunk being served; thus, restriction is not to be applied. This ground on lead AS provides as high at the output of gate G147 and a ground at the output of enabled gate G146 on line CRT to the digit analyzer.

Ground on lead $\overline{ORSC}$ also enables gates G148, G149 and G150 so that the digit analyzer may signal the restrictor adapter and its associated outgoing register sender via lines CTM, SBY and RSC. If the digit analyzer determines that the call is to be blocked, ground will be provided on lead SBY which sets the busy flip-flop formed by gates G137 and G138 via enabled gate G149. When the timing is to be cancelled producing immediate release of the outgoing register sender after the last digit has been outpulsed, ground is provided on lead CTM to gate G150, the output of which clears the demand evaluation flip-flop formed by gates G143 and G144. Until this flip-flop is cleared, the outgoing register sender will continue to demand an evaluation after each new digit is received in its storage since a ground at the output DER to the ougoing register sender will maintain the demand flip-flop therein in a set condition.

The setting of the set busy flip-flop formed by gates G137 and G138 provides a ground at the output of gate G151 on line SB to FIG. 4, which, as previously indicated, is applied to the input of gate G27 in FIG. 3 to shut off the transistor Q4 and thus block the call. When the demand evaluation flip-flop formed by gates G143 and G144 is set, ground is applied on line $\overline{CTM}$ to the outgoing register sender in FIG. 4 where it is applied to gate G100 producing a cancelling of the timing in the manner previously indicated.

DIGIT ANALYZER

The main purpose of the digit analyzer is to examine the digits stored in the main memory of an outgoing register sender to (1) check for toll restriction and (2) advise the outgoing register sender when it can release, i.e., when all digits have been received that can be expected. This circuit has storage facilities for up to three digits and provides for numerous strapping options in the examination of the digits presented thereto.

The analyzer functions under control of the ORS control in the manner already described and performs its analyzing function on digits in groups of three. In other words, the first 3 digits in the main memory of the outgoing register sender are read into the storage facility in the digit analyzer and analyzed. Information pertaining to these digits is stored and they are erased. Then, the next three digits are read in, stored and examined. These also may be erased and three additional digits examined if necessary. Limited decoding is provided in the digit analyzer; however, if office and area codes must be examined they are strapped to the office code decoder and the area code decoder which provides the decision to allow or restrict.

Based on the first and subsequent digits received from the outgoing register sender, the digit analyzer can determine how many digits in total should be expected. The outputs of the read-in counter C1 in the outgoing register sender (FIG. 6) are presented to the digit analyzer so that it can determine how many digits have been received. By comparing those expected to those received, the digit analyzer can signal the outgoing register sender when it has received all of the expected digits and can release.

On a class of service basis, certain stations of the PBX may be blocked from gaining access to trunks, and others may be granted complete freedom in placing toll calls. In other cases, certain stations may be permitted to gain access to trunks, but only for certain limited purposes. For example, a station may be permitted access to a trunk only for service calls, only for calls within the local area, only to certain distant areas, or only to certain exchanges in certain distant areas. Toll access and service codes are decoded by the digit analyzer; however, area and office codes are decoded by the area code decoder 156 and the office code decoder 155, which are provided as separate circuits associated with the digit analyzer.

Following the receipt of each digit, during the interdigital period, the outgoing register sender requests an analyzation of all the digits in its storage by the digit analyzer. An analyzation must be made before the outgoing register sender is allowed to outpulse the digit due to the possibility of restrictions placed on the various stations as to the use of an outgoing trunk as already discussed. Due to the fact that one digit analyzer serves a large number of outgoing register senders on a time-shared basis, occasionally several digits may be keyed into an outgoing register sender before an analysis can be made. In this case, when the digits stored in the main memory of the outgoing register sender are examined, then all digits received to that point can be outpulsed, but not before then.

Figure 11:
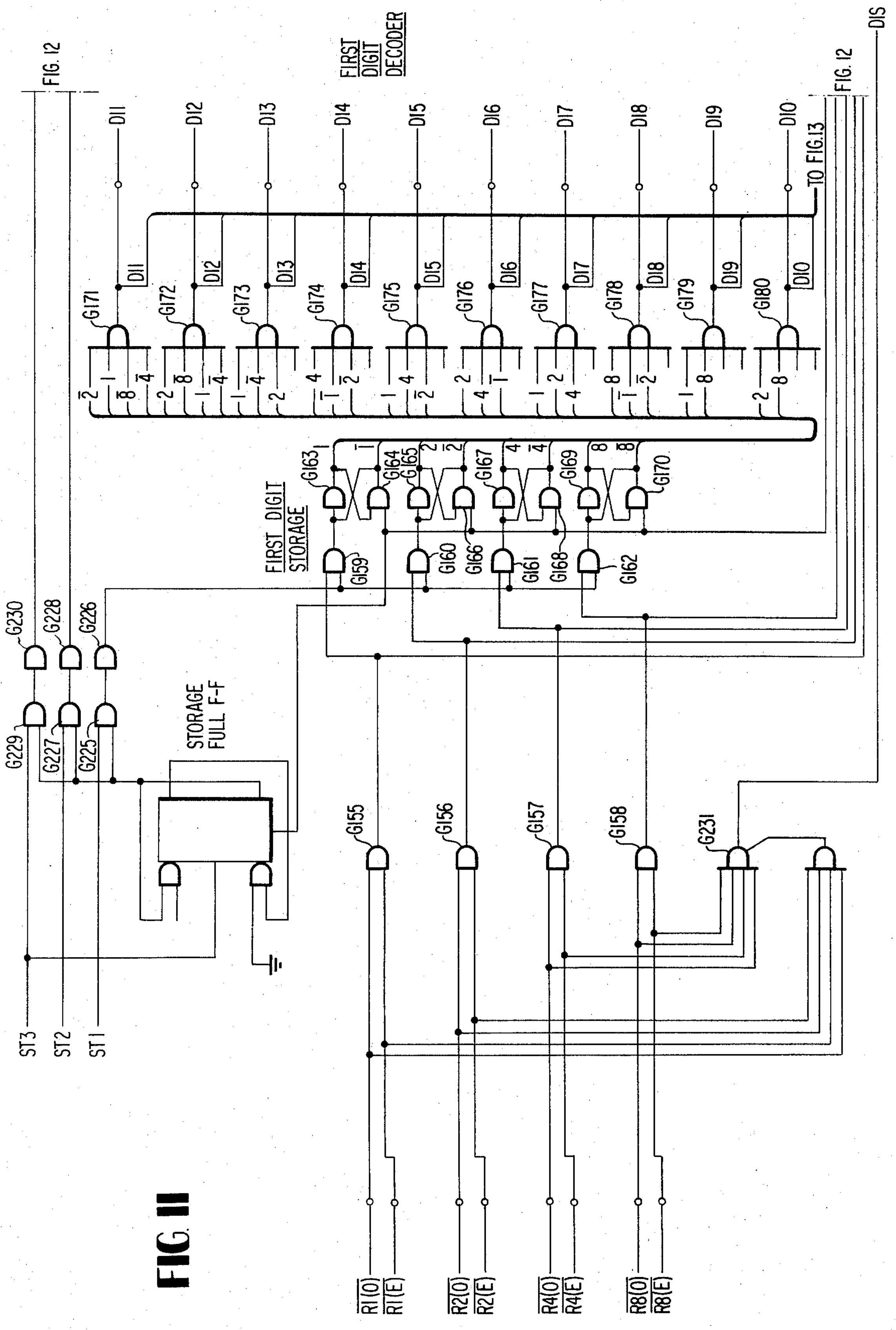
Figure 12:
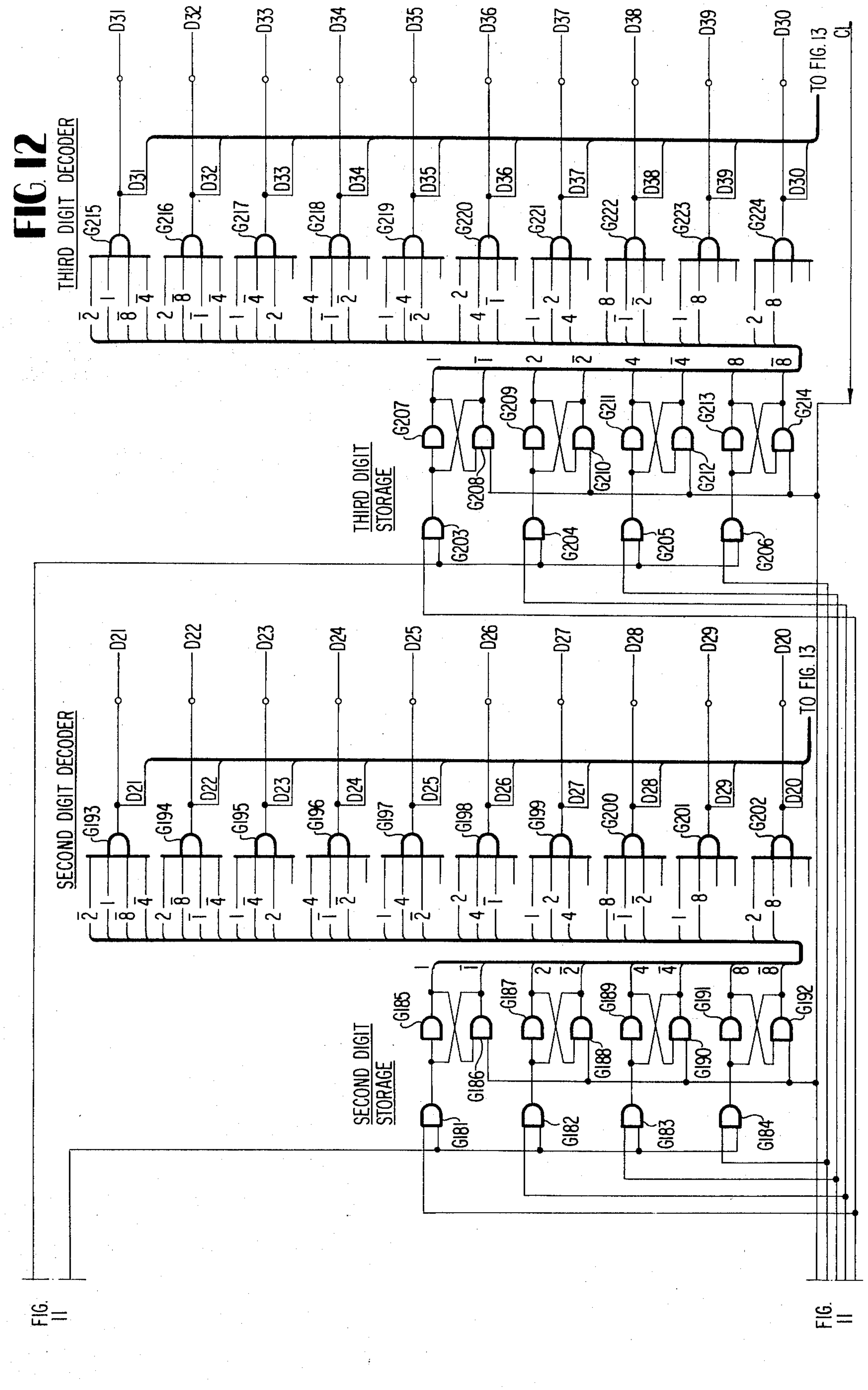

FIGS. 11 and 12 in combination illustrate the storage facility provided in the digit analyzer for storing up to three digits. The digits are received directly from the outgoing register sender (FIG. 6) on lines R1–R8 where they are applied through gates G151–G158 to the inputs of three respective groups of gates associated with the individual first, second and third digit storage facilities. The first group of gates G159–G162 are connected to the SET inputs of four respective flip-flops formed by gates G163–G164, G165–G166, G167–G168 and G169–G170. The outputs from these flip-flops are decoded by gates G171–G180 to convert the binary values stored in the flip-flops to a decimal value representing numerical value of the digit received. The outputs from the gates G171–G180 are applied directly to both the office code decoder 155 and area code decoder 156. The outputs from gates G155–G158 are also connected to the storage facility for the second digit via gates G181–G184, which insert the applied information into storage flip-flops formed by gates G185–G186, G187–G188, G189–G190 and G191–G192. The information stored in these flip-flops is decoded in gates G193–G202, which provide decimal outputs directly to the office code decoder 151 and area code decoder 156. The binary data representing the third digit is applied from gates G155–G158 through gates G203–G206 to storage flip-flops formed by gates G207–G208, G209–G210, G211–G212 and G213–G214. The binary data stored in these flip-flops is decoded by gates G215–G224, the outputs of which are applied directly to the office code decoder 155 and the area code decoder 156.

If the digit stored in the first digit storage is a 3, then ground will be provided on lead D13. The second digit stored produces ground on one of leads D2-, and the third digit produces ground on one of the leads D3-. Since only three digits can be stored at once, if a recognizable code is detected and additional digits must be examined in order to make a decision about the call, then the digits in storage must be cleared out by application of ground to the line CL, which clears all of the flip-flops in each of the first, second and third digit storages, before additional digits can be received from the outgoing register sender.

Usually only three digits need be examined in order to determine whether the call is to be allowed or blocked; however, if toll calls are to be allowed to certain areas and to selected offices within those chosen areas, then the toll access code must be erased and the area code examined and erased and then the office code examined. So that the respective codes may be properly decoded, the digits of the code must be stored in the proper order in the various storage facilities. In other words, the first digit of the code must be in the first storage facility and the second digit of the code must be in the second storage facility, etc. Since the number of digits in the toll access code varies between 1 and 3 digits, the steering of the area and office codes into the proper storage facilities in the digit analyzer requires special control. Thus, if the toll access codes are three digit codes, then the steering of digits into the digit analyzer's three-digit storage is quite straight forward. However, if one or two digit toll access codes are used, the analyzer must make a corresponding shift in the steering of the respective digits into the storage facilities so that subsequent digits will be stored in the proper order. For example, if the toll access code is formed by a single digit, that digit must be stored in the first digit storage. However, the three digits following the toll access digit will form the area or office code and the first digit of this three digit combination must also be stored in the first digit storage. In such a case, both the first and second digits of the first four digits dialed must be steered into the first digit storage with the third and fourth digits being steered into the second and third digit storages, respectively.

Figure 15:
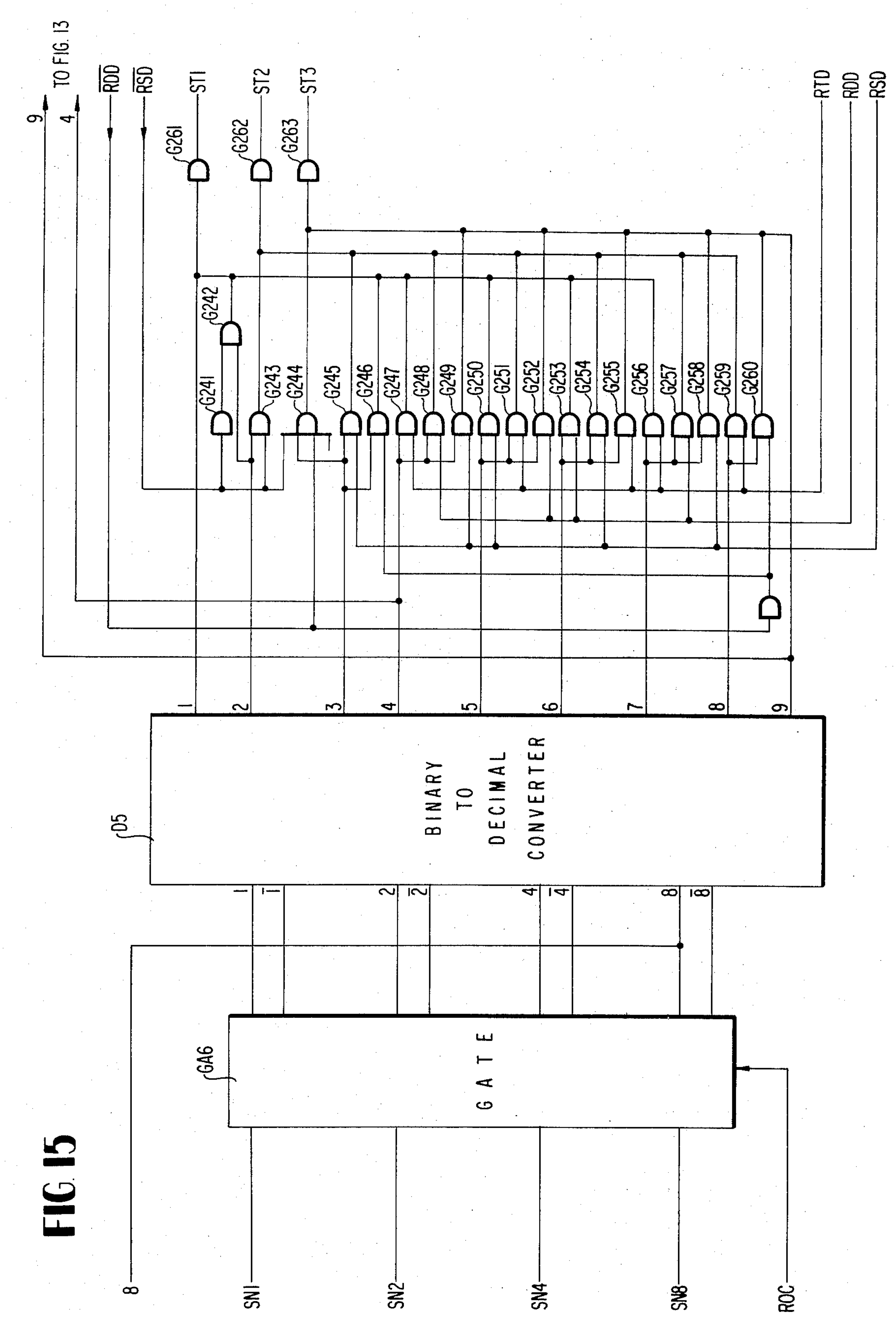

In order to provide for proper steering of the digits into the storage of the digit analyzer, steering signals ST1, ST2 and ST3 are generated in the sequence in which the various digits are to be applied to the respective storage facilities by the circuitry in FIG. 15 and these signals are utilized to gate the data into the respective storage facilities. For example, the steering signal ST1 is applied through gates G225 and G226 to enable the input gates G159–G162 to allow the data from the output of gates G155–G158 to enter the first digit storage. The steering signal ST2 is applied via gates G227 and G228 to enable input gates G181–G184 to permit the next digit received from the outgoing register sender to enter the second digit storage. The steering signal ST3 passes gates G229 and G230 to enable input gates G203–G206 permitting the digit received from the outgoing register sender appearing at the output of gates G155–G158 to enter the third digit storage. The manner in which the steering signals ST1–ST3 are generated for each number which is dialed by a station user will be described in detail below in connection with the circuitry of FIG. 15.

Since only three digits can be stored at once, when the third digit storage is filled, the storage full flip-flop is set by the steering pulse ST3. This flip-flop prevents further application of the steering signals to the respective storage facilities by disabling gates G229, G227 and G225 until the storage is cleared via line CL. Thus, if another digit is read in, it is not steered into the first digit storage and superimposed on the digit already stored there.

The ORS control steers the readout of the digits from the outgoing register sender without knowing how many digits have been dialed into the outgoing register sender. Each digit which is read out provides ground on one of the leads R1–R8 which produces a high on line DIS at the output of gate G231. If a digit is not present in the storage in the main memory when that storage is addressed from the ORS control, no digit will be received in the digit analyzer and line DIS will remain at ground. This will indicate, if the digit analyzer has not received sufficient digits to make a determination of the acceptability of the call, that further digits must be received from the outgoing register sender.

Figure 13:
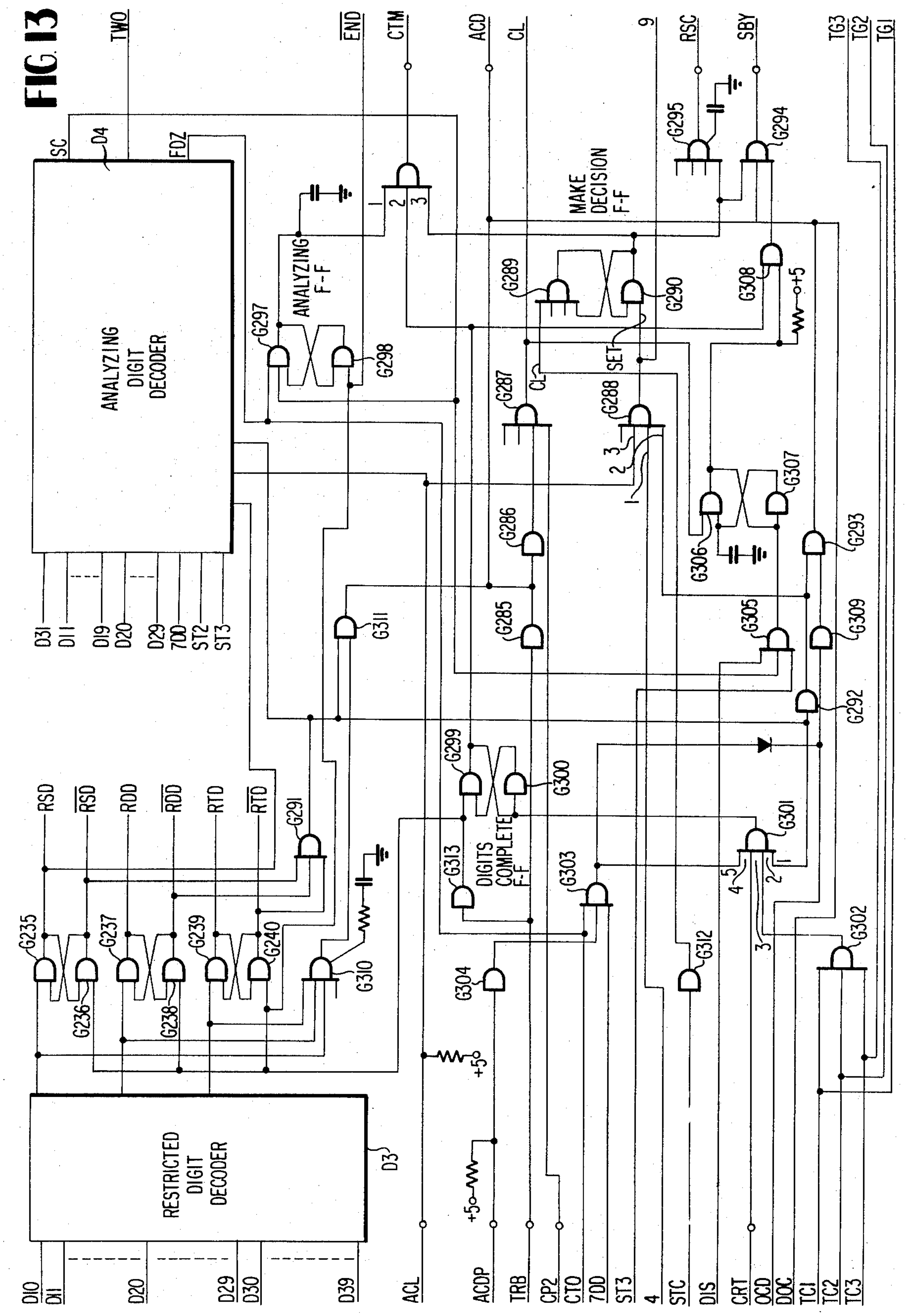

As seen in FIG. 13, the digit analyzer includes a restricted digit decoder D3 which analyzes the digits received and stored in the first, second and third digit storages in various combinations to determine when a toll access code has been dialed and how many digits the toll access code consists of. The restricted digit decoder includes a typical strapping arrangement (not shown) which permits consideration of various digit combinations which may make up a toll access code and groups these recognizable codes into single digit, double digit and triple digit codes. When a single digit toll access code is recognized by the restricted digit decoder D3, an output is provided which sets the flip-flop formed by gates G235 and G236 placing a high on line RSD and ground on line $\overline{RSD}$. When a double digit toll access code is recognized, the flip-flop formed by gates G237 and G238 placing a high on line $\overline{RDD}$ and ground on line RDD. When a three digit toll access code is detected in the restricted digit decoder D3, the flip-flop formed by gates G239 and G240 is set placing a high on line RTD and ground on line $\overline{RTD}$.

The timing circuit which generates the steering signals for directing digits from the outgoing register sender into the proper first, second or third digit storage is illustrated in FIG. 15. At the same time the analyzer is receiving digits from the outgoing register sender, it also receives inputs on lines SN1–SN8 (FIG. 9) from the ORS control indicating which digit is being read out of the outgoing register sender to the digit analyzer. The binary input representing the digit being read out is applied through gate GA6, enabled by the input ROC, to the binary-to-decimal converter D5. The converter D5 enables one of the output leads 1–9 thereof in accordance with the binary coded decimal information received as to the number of the digit which is being read into the storage of the digit analyzer. The output of the converter D5 is applied to a plurality of gates G241–G260 which serve as a decoder which provides the proper sequence of steering signals ST1, ST2 and ST3 at the output of gates G261–G263. Also applied to the gates G241–G260 are the signals RTD, RDD, RSD, $\overline{RSD}$ and $\overline{RDD}$ which indicate the number of digits in the toll access code dialed by the station user.

As already indicated, if a toll access code is not dialed, then the digits may be steered in sequence into the first, second and third digit storages; whereas, if a toll access code is dialed, depending upon the number of digits in this code, the dialed digits may have to be steered into the various storage facilities in other than a normal sequence. For example, if the toll access code dialed consists of a single digit, RSD will be high enabling gates G258, G254, G,250 G249 and G245. Also, ground received on line $\overline{RSD}$ produces a high at the output of gate G241 enabling gate G242. The remainder of the gates are disabled. Thus, the first output from the converter D5 will pass directly to the gate G261 producing a ground on line ST1. The second output from the converter D5 will pass through gate G242 also to gate G261 to produce an output on line ST1. The third output from the converter D5 will pass through gate G245 to gate G262 producing a ground on line ST2. The fourth output from the converter D5 will pass through gate G249 to gate G263 producing a ground on line ST3. The fifth output from the converter will pass through gate G250 to gate G261 producing ground on line ST1, the sixth output from the converter will pass through gate G254 to gate G262 producing a ground on line ST2 and output 7 from the converter will pass through gate G258 to gate G263 producing a ground on line ST3. Since no analysis of digits beyond the seventh digit is necessary where the single digit toll access code is dailed, further steering signals will not be generated. As can be seen, with the line RSD enabling appropriate gates for a single toll access digit, the digit steerage signals will be generated in the following sequence: ST1, ST1, ST2, ST3, ST1, ST2, ST3. A further shifting of the steerage by one digit is accomplished when a double digit toll access code is detected and then the steerage signals will be generated in the sequence: ST1, ST2, ST1, ST2, ST3, ST1, ST2, ST3.

As already indicated, one of the basic functions of the digit analyzer is to indicate to the outgoing register sender when it has received all of the digits which it can expect so that the outgoing register sender can release immediately upon outpulsing of all of the dialed digits without delay. At the same time that the digit analyzer is receiving digits for storage from an outgoing register sender, it receives on lines DC1–DC8 from the outgoing register sender (FIG. 6) a binary indication of the number of digits which the outgoing register sender has received, as indicated by the count of the steering in counter C1 therein. Based primarily on the nature of the first code detected, the digit analyzer can determine how many digits will be dialed, and therefore whether the outgoing register sender has received all digits it should expect. For example, if the first three digits received indicate a service code, then three digits is all that should be expected, or if an office code is detected, seven digits are to be expected. If the total number of digits received by the outgoing register sender as indicated by the count of the steering in counter C1 therein corresponds to that determined by the analyzer, the digit analyzer will signal the outgoing register sender to release immediately after outpulsing the last digit which it has received.

If the first digit or digits indicate a toll access code has been dialed, the analyzer must inspect the digits following the toll access code to determine whether this code is being followed by a foreign area code or an office code. If the succeeding group of digits is a 1 or 0, an area code is presumed and the total number of digits to be expected will be 11, 12 or 13, depending on the number of digits in the toll access code, instead of eight, nine or 10 in the case of an office call. For purposes of the present invention, any three-digit code is presumed to be an office code unless it is detected as a toll access or service code or it follows a toll access code and its middle digit is a 1 or 0 indicating an area code. Thus, decoding an actual office code is not required for this purpose.

Figure 14:
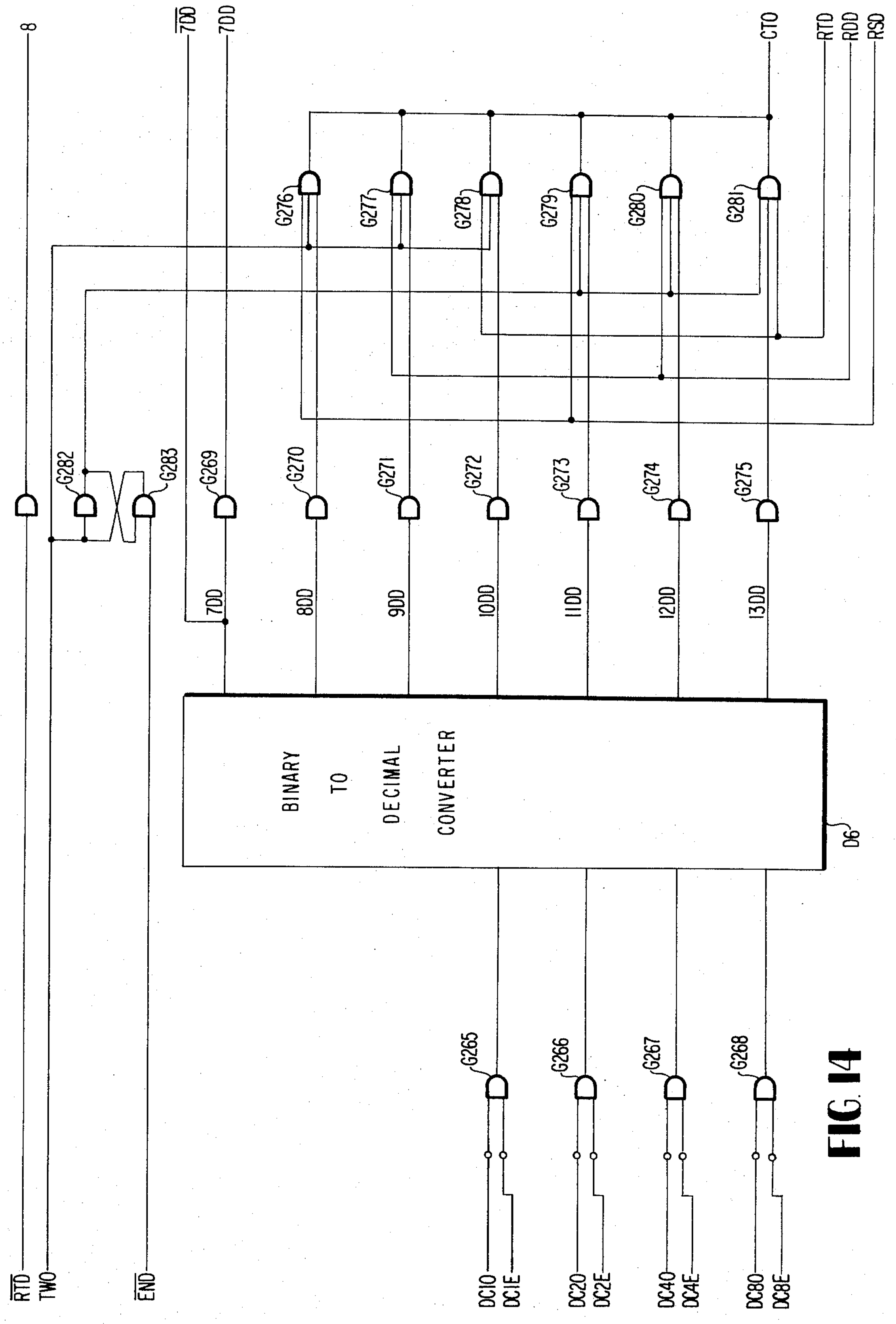

FIG. 14 illustrates the circuitry in accordance with the present invention which determines when the digits received by an outgoing register sender are all of the digits which can be expected. The binary indication from the outgoing register sender of the number of digits which have been dialed are received on inputs DC1–DC8 and are applied via gates G265–G268 to the binary-to-decimal converter D6. The converter D6 provides an indication for 7 through 13 digits dialed on lines 7DD–13DD. These outputs are applied through gates G270–G275 to the inputs of gates G276–G281. The latter group of gates are selectively enabled by the signals on lines RTD, RDD and RSD from FIG. 13 which indicate the number of digits in the dialed toll access code. In addition, the analyzing digit decoder D4 in FIG. 13 provides a high on line TWO when the dialed toll access code is followed immediately by an office code and provides ground on this line TWO when the toll access code is followed by an area code and an office code. The signal on line TWO is applied in FIG. 14 to a flip-flop formed by gates G282 and G283 with the line TWO serving as an enabling signal for gates G276–G278 and the output of the flip-flop serving as an enabling signal for gates G279–G281.

In the normal case where no indication of a dialed toll access code is received, the output 7DD from the binary-to-decimal converter D6 will normally indicate all digits dialed. However, when the restricted digit decoder D3 in FIG. 13 indicates that a single, double or triple digit area code has been dialed by placing high on leads RSD, RDD or RTD, respectively, this in combination with the information received on line TWO from the analyzing digit decoder D4 will permit only one of the gates G276–G281 to be enabled when the proper number of digits to be dialed is received by the outgoing register sender. Thus, if RSD is high, either 8 or 11 digits can be expected; if RDD is high, either nine or 12 digits can be expected; and if RTD is high, either 10 or 13 digits can be expected. On the other hand, if line TWO is at ground potential, two groups of up to three digits each will precede the normal seven-digit number so that 11, 12 or 13 digits can be expected. On the other hand, if the line TWO is high either eight, nine or 10 digits can be expected. By combining this information in the gates G276–G281, the number of digits which can be expected are determined and when this number is received as indicated by an output from the binary-to-decimal converter D6, an output CTO will be generated.

Looking now to FIG. 13, which provides the logic control circuitry for the digit analyzer, ground is normally applied at the output of gate G287 to line CL which clears the first, second and third digit storages (FIGS. 11 and 12) when the digit analyzer is idle. When the ORS control connects an outgoing register sender to the digit analyzer, ground is received on lead TRB which is applied through gates G285 and G286 to gate G287, whose output becomes high removing the ground from line CL. The ORS control then steers the readout of digits from the outgoing register sender to the digit analyzer one at a time. The digits are converted to decimal form and stored in the proper digit storage from which they are applied to the office code decoder and area code decoder for analyzation. At the same time, this stored data is applied to the restricted digit decoder D3 and the analyzing digit decoder D4 which analyze the stored digits to determine whether a toll access code, a service code or a call to the operator has been dialed. As a result of the analyzation made on the digits stored in the digit analyzer, it must be determined whether the call is to be restricted, whether the call is to be allowed, or whether insufficient data has been received to make a determination as to whether the call is to be restricted or allowed.

If the call is to be restricted, the digit analyzer connects ground to the output lead SBY which signals the outgoing register sender to release immediately and the associated trunk to block the call and return busy tone to the calling party. If the call is to be allowed, the analyzer must determine when the outgoing register sender has received all of the digits which it can expect so that the outgoing register sender may release immediately after outpulsing the last digit in its storage. Ground on lead CTM will signal the outgoing register sender to release immediately after it has completed outpulsing of all digits in its storage. If the outgoing register sender has not received enough digits for the digit analyzer to make the decision required, then the analyzer will ground lead RSC to signal the outgoing register sender that it must obtain the services of the digit analyzer again after it has received another digit. If a decision cannot be made and the outgoing register sender does not receive another digit, after a given time period, the outgoing register sender will signal the associated trunk to block the call and return busy tone to the calling party. The outgoing register sender will then release.

Since only 3 digits will normally be needed to determine whether the call is to be allowed or blocked, unless it is determined that a toll call is being placed, a decision will be made following storage and analyzation of the first 3 digits as to the allowability of the call. If the first 3 digits dialed indicate a service code or a call to the operator, during the period when the 4th digit would normally be read in from the outgoing register sender, gate G288 will be enabled setting the make decision flip-flop formed by gates G289 and G290. Input number 1 to gate G288 is derived from the output of the binary-to-decimal converter D5 in FIG. 15 and will be high during the period when the fourth digit would normally be read in from the outgoing register sender. Input 2 to the gate G288 is connected to the output of gate G291 via gate G292 and will be high when all of the inputs to the gate G291 are high indicating that no toll access code has been detected by the restricted decoder D3. Input 3 to the gate G288 is connected to the line ACL, which is at ground potential only when an allowable area code has been detected by the area code decoder 156. Thus, input 3 to the gate G288 will be high when no acceptable area code is detected. With all of the inputs to the gate high, indicating a service code or a call to the operator, the output thereof will be ground setting the make decision flip-flop formed by gates G289 and G290.

The high at the output of the make decision flip-flop is applied on one hand to an input of gate G294, the output of which is connected to the line SBY, which, when grounded, indicates to the outgoing register sender and trunk circuit that a busy indication is to be returned to the calling station. However, if the first three digits dialed indicate a service code or a call to the operator, the call should be permitted and therefore the gate G294 must be blocked at this time. The blocking of the gate G294 is accomplished by the ground at the output of gate G293 the input of which is connected to gate G291 via gate G292. As indicated above, when no toll access code has been dialed, the output of gate G291 will be ground placing a high at the output of gate G292 and ground at the output of gate G293, which blocks the passing of the high through gate G294 from the make decision flip-flop.

The high at the output of the make decision flip-flop is also applied to an input of gate G296, the output of which is connected to the line CTM, which when grounded indicates to the outgoing register sender to release immediately when all digits have been outpulsed which have been received thereby. Since a service code or call to the operator entails three or less digits, the three digits already received in the outgoing register sender and stored in the digit analyzer will be sufficient and therefore gate G296 should be enabled at this time. In order to complete the enabling of the gate, both the analyzing flip-flop formed by gates G297 and G298 and the digits complete flip-flop formed by gates G299 and G300 must be set. A high will be produced at the output of the analyzing flip-flop when ground is received on line FDZ from the analyzing digit decoder D4 indicating that the first digit is zero and the call is a call to the operator, when a ground is provided on line CTO from FIG. 14 indicating that all of the digits which can be expected have been received by the outgoing register sender, and when output SC from the analyzing digit decoder D4 is at ground potential indicating that the call has been determined to be a service call. Thus, in the case of a service call or a call to the operator, a high will be found on input 1 of gate G296 as a result of the analyzing flip-flop being set.

The digits complete flip-flop formed by gates G299 and G300 is set from the output of gate G301. Ground is provided on input 1 of this gate directly from the output of gate G291 indicating that a toll access code has not been detected. Ground may also be provided on input 2 of gate G301 from the output of gate G302 if none of the particular trunk groups have been dialed. Also, since all forms of restriction are cancelled if the attendant is placing a call, the connection of the attendant register will produce a ground on line CRT into input 3 of the gate G301 indicating that restriction is to be cancelled. If a service code or a call to the operator entailing three or less digits has been dialed, the output of gate G303 to input 4 of gate G301 will also be at ground potential since input CTO will be high (a toll call is not involved), input $\overline{7DD}$ will be high (seven digits have not been dialed) and the output of gate G304 will be high since ground is provided on the input ACDP so long as the area code decoder is connected to the digit analyzer.

Thus, the foregoing conditions at the input of gate G301 will place a high at the output thereof setting the digits complete flip-flop and providing a high at input 2 to the gate G296. Since all of the inputs to the gate G296 are high at this time, a ground will be placed on line CTM indicating that timing is to be cancelled and the outgoing register sender is to release as soon as all digits therein have been outpulsed.

If at the time the digits are being transferred to the digit analyzer from the outgoing register sender less than three digits have been received by the outgoing register sender and a service code is being dialed requiring the analyzation of at least three digits, it will not be possible for the digit analyzer to make a decision during the period when the fourth digit would normally be read in from the outgoing register sender, i.e., at the time the make decision flip-flop is first set. Thus, it is necessary to block the gate G294 preventing the application of ground to the line SBY and abandonment of the call at this time and to request further digits from the outgoing register sender. At the time the third digit is to be steered into the digit storage indicated by appearance of the steering signal ST3 at the input of gate G305 if the input line DIS from FIG. 11 is at ground potential indicating that a digit has not been received from the outgoing register sender, and line SC from the analyzing digit decoder D4 is at ground potential indicating that a service code is possible, gate G305 will produce a high at the output thereof setting the flip-flop formed by gates G306 and G307, which, in turn, places a high at the input of gate G308. Ground at the output of gate G308 blocks the high from the output of the make decision flip-flop to gate G294 and prevents ground potential from being applied to the line SBY. However, the high at the output of the make decision flip-flop will be applied to gate G295 producing a ground on line RSC indicating a request for additional digits for analyzation.

If only the digit 0 has been dialed indicating a call to the operator, the gate G296 will be enabled by setting of the analyzing flip-flop since the output FDZ will be ground at this time indicating that the first digit is 0. Thus, ground will be applied also on the output of the line CTM which will cancel timing. On the other hand, if the digit dialed was not a 0, then no ground will be applied on the line CTM, timing will continue; and the ground on the line RSC will produce the transfer of additional digits to the digit analyzer as they are received.

If the make decision flip-flop is not set during the steering of the fourth digit, from the output of gate G288, it will be automatically set following steering of the ninth digit by ground on line 9 from the output of the binary-to-decimal converter D5 in FIG. 15. In other words, if it is clear from the analyzation of the first three digits that a toll call including a toll access code, an area code and/or an office code will be dialed, it is useless to make a decision concerning the acceptability of the call after the receipt of only three digits. Thus, the make decision flip-flop will not be set until after the steering of the ninth digit, at which time nine digits which may include a three-digit toll access code, an area code and an office code have been received.

When an acceptable office code has been detected by the office code decoder 155, ground will be provided on the line OCD and applied via gates G309 and G293 to the input of gate G294 blocking the gate at the time the make decision flip-flop is set during the steering of the ninth digit. On the other hand, if an acceptable office code within a particular acceptable area is detected by the area code decoder 156, ground will be provided on lead DOC directly to the input of gate G294 also blocking the gate at the time the make decision flip-flop is set. In either case, ground is not applied on the line SBY, but is provided on the line RSC requesting further digits from the outgoing register sender. When all digits have been received by the outgoing register sender which can be expected, ground will appear on line CTO setting the analyzing flip-flop and producing ground on line CTM at the output of gate G296.

In order that the toll access, area and office codes may be properly decoded, the digits of the code must be stored in the proper order in the storage bins and analyzed, the toll access code must be erased and the area code examined and erased, and the office code must be examined. Thus, when a toll access code is detected by the restricted digit decoder D3, the output of gates G291 and G310 will place a high at both inputs of gate G311 producing ground at the input of gate G286. This results in ground on line CL which erases the digits in the first, second and third digit storages. In the same manner, after an acceptable area code has been detected in the area code decoder, as evidenced by ground on line ACD to the input of gate G286, ground will once again be applied on the line CL erasing the area code stored in the first, second and third digit storages.

When the make decision flip-flop is set and the decision to block the call, cancel timing or provide additional digits is sent to the outgoing register sender, the outgoing register sender removes ground from the lead STC placing a high on this lead and producing a ground at the output of gate G312 which resets the make decision flip-flop. The removal of ground from the lead STC also causes the ORS control to release, which removes ground from the lead TRB. As a result, ground is provided at the output of gate G313 which clears all of the flip-flops. The digit analyzer is now ready to service another register sender.

OFFICE CODE DECODER

An example of a typical office code decoder is illustrated in FIG. 16. This circuit functions under control of the digit analyzer and provides for detecting a plurality of (three-digit) office codes. The circuit is electrically separated into two sections of six and four office codes, respectively, in the illustrated example. The codes detected by a particular section must all start with the same first digit since the circuit is connected so that the first digit is electrically common for that entire section. The codes to be detected are strapped on a programming panel (not shown) providing versatility in the various codes to be detected. For a given group of office codes, beginning with the same first digit, the first digit need be strapped only once and the second and third digit of each code is strapped individually. If there are more codes beginning with the same first digit than can be accommodated by one section, several sections may be used. By connecting the FDC (first digit code)lead of two or more sections together and strapping to a particular "first digit," the sections will function as one section.

As already indicated, a primary function of the digit analyzer is to examine the digits being transmitted to the central office by an outgoing register sender on an outgoing trunk call and determine if the station user is dialing an allowed number based on his class of service. If the first three digits dialed to the central office indicate a legitimate office code, the call is allowed to proceed uninhibited, since at this point the calling party cannot dial additional digits which would direct him to toll equipment or a toll operator. The digit analyzer receives the first 3 digits dialed from the outgoing register sender and examines these digits in the office code decoder. If the digits dialed match those of a central office code by virtue of the decoding strapping panel, this circuit detects the fact and connects ground to lead OCD to signal the digit analyzer that an acceptable office code has been detected. If three digits are read out and lead OCD is not grounded, the digit analyzer construes this to mean that something other than a legitimate code was dialed and the call is blocked and busy tone returned to the calling party in the manner already described.

For purposes of illustration, if it is assumed that lead FDC(1), SDC4 and TDC4 (representing second digit code 4 and third digit code 4) have been strapped on the decoding panel to represent office code 238, then if this office code is dialed, ground will be extended to those leads when the first three digits are read out. Ground on these leads results in inputs of gate G350 being high, thus the input of gate G351 is ground providing ground on the output of gate G352 to the lead OCD. This signals the digit analyzer that an acceptable code has been dialed.

AREA CODE DECODER

As already indicated, a primary function of the digit analyzer is to examine the digits being transmitted to the central office by the outgoing register sender on an outgoing trunk call and determine if the station user is dialing an allowed number based on his class of service. Some station users are allowed, by virtue of their class of service, to dial selected office codes in specific foreign areas. Thus, if a direct-dialed access code is dialed and the class of service of the calling station indicates that a check of the area and office code is required, the area code decoder is employed in conjunction with the digit analyzer to analyze the codes dialed. First, the digit analyzer causes the three digits of the area code to be read out simultaneously and decoded. If the code indicates an allowed area, then this fact is stored and the next three digits are read and decoded to determine if the office code is allowed within the area dialed.

The allowed area and office codes are generated by use of straps in a strapping panel (not shown) which is located between the digit analyzer and the area code decoder. For example, in FIG. 18, lead FAC1 is strapped to a lead which indicates the first digit of the first area code, lead FAC2 is strapped to a lead which indicates the second digit of the first area code and lead FAC3 is strapped to a lead which indicates the third digit of the first area code. If the three digits analyzed correspond to those of the first allowed area code, ground will be provided at the output of gate G360. Similarly, the second area code is detected by ground at the output of gate G361 and a third allowable area code is detected by ground at the output of gate G362. Since the digit analyzer will receive only 3 digits at a time, the acceptability of the first three digits representing the area code must be stored so that these digits may be erased and the second set of three digits may be received and analyzed to determine whether an acceptable office code is dialed. Thus, the output of gate G360–G362 is applied to respective first, second and third area flip-flops formed by gates G363–G364, G365–G366, and G367–G368, respectively.

The allowed office code within the first area, as seen in FIG. 17, is provided by leads OC11, OC12 and OC13, which are strapped to indicate the first, second and third digits of the first office code. Leads OC21, OC22 and OC23 are strapped to indicate the first, second and third digits of the second office code, etc. Each of the three leads associated with a respective office code is connected to the input of one of the gates G369–G377. It is noted from FIG. 17 that three sets of three office codes are associated with the respective three area codes, with each area code having three acceptable office codes associated therewith. Obviously, the number of area codes and the number of office codes associated with a particular area code may be increased or decreased by the mere addition or deletion of gates without departing from the teachings of the present invention.

When the digit analyzer is in the process of examining the digit stored in an outgoing register sender, ground is connected to lead TRB therefrom which provides a high at the output of gate G378 clearing the first, second and third area code flip-flops. If the first three digits examined constitute an acceptable area code, ground will be connected to one of the three groups of area code input leads in FIG. 18. Thus, the inputs to one of the three gates G360-G362 will all be high producing a ground at the output thereof which will set the area code flip-flop connected thereto. Ground, slightly delayed, will also appear on lead ACD via gates G379 and G380 and the flip-flop which is set will provide ground on lead ACL and also enable the three office code gates G369–G371, G372–G374 or G375–G377. Ground on lead ACD to the digit analyzer causes the digit analyzer to discontinue the reading of the first three digits and initiates reading of the second 3 digits thereby. If an allowed office code has been dialed within the area code previously read, ground will be provided on the three input leads in FIG. 17 associated with this office code. All of the inputs of the particular office code gate will be high so that a ground will be provided at the output thereof to lead OCD indicating to the digit analyzer that an allowed office code has been detected within an allowed area. When the digit analyzer completes its check, ground is removed from lead TRB which provides a ground to clear any flip-flop which has been set.

If, after reading a set of three digits, an acceptable area or office code is not indicated, the digit analyzer will determine whether an insufficient number of digits has been dialed to determine the destination of the call or whether the call is to be blocked and busy tone returned to the calling party, as already described. In either case, the digit analyzer deals directly with the outgoing register sender and the area code decoder is not effective.

We claim:

1. In a PBX telephone system including at least one trunk circuit extending to a central exchange, a register sender system for controlling the transfer of digits of subscriber data to said central exchange via said trunk circuit comprising
   register sender means for storing and outpulsing said digits of subscriber data,
   digit analyzer means for analyzing the digits stored in said register sender means to determine whether said subscriber data relates to calls which are permitted for the subscriber attempting to establish the call, and
   control means responsive to the receipt and storage of subscriber data in said register sender means for connecting said digit analyzer means to said register sender means on a time shared basis.

2. A system as defined in claim 1, wherein said register sender means includes a main memory capable of storing selected data at a plurality of individually addressed storage areas, a steering-in counter for sequentially addressing the storage areas of said main memory to store data therein, and a steering-out counter for sequentially addressing the storage areas of said main memory to read-out data therein.

3. A system as defined in claim 2, wherein said register sender means further includes a temporary storage for a single digit and transfer means for automatically transferring the digit in said temporary storage to said main memory within a given time after receipt thereof in said temporary storage.

4. A system as defined in claim 3, wherein said transfer means includes means for automatically advancing said steering-in counter subsequent to transfer of a digit to said main memory.

5. A system as defined in claim 2, wherein said register sender means further includes first gating means responsive to control from said control means for connecting the storage areas of said main memory to said digit analyzer means in sequence.

6. A system as defined in claim 2, wherein said register sender means further includes impulse relay means for transmitting impulses through said trunk circuit to said central exchange and actuating means for applying clock pulses to actuate said impulse relay means for the number of times corresponding to a digit stored in said main memory.

7. A system as defined in claim 6, wherein said register sender means further includes an outpulsing counter, and means for pre-setting said outpulsing counter to the complement of a digit stored in said main memory, said actuating means also applying said clock pulses to said outpulsing counter to advance said counter, said outpulsing counter producing an output upon reaching a maximum count, which output is applied to said actuating means to inhibit further application of clock pulses to said impulse relay means.

8. A system as defined in claim 7, wherein said register sender means further includes means responsive to said outpulsing counter reaching said final count for resetting said outpulsing counter and advancing said steering-out counter after a given delay period.

9. A system as defined in claim 6, wherein said register sender means further includes data detection means for inhibiting said actuating means so long as no data is stored in said main memory.

10. A system as defined in claim 6, wherein said register sender means further includes demand evaluation means responsive to said digit analyzer means for inhibiting said actuating means until the digits stored in said main memory have been analyzed and approved by said digit analyzer means.

11. A system as defined in claim 2, wherein said digit analyzer means includes storage means for storing a plurality of digits received from said register sender means and analyzing means for determining from the digits in said storage means the total number of digits which the register sender means can be expected to receive.

12. A system as defined in claim 11, wherein said register sender means includes second gating means for connecting the output of said steering-in counter representing the number of digits received by the register sender system to said digit analyzer means, said digit analyzer means including comparison means for providing a signal to said digit analyzer means indicating that all digits have been received in response to the output of said steering-in counter corresponding to the output of said analyzing means.

13. A system as defined in claim 1, wherein said digit analyzing means includes office code decoding means for detecting whether the received digits in said register sender means relate to an acceptable office code.

14. A system as defined in claim 13, wherein said digit analyzing means includes call abandonment means for abandoning a call after a certain time period during the dialing of a call and said office code decoding means includes means for inhibiting said call abandonment means upon detecting digits relating to an acceptable office code.

15. A system as defined in claim 1, wherein said digit analyzing means includes area code decoding means for detecting whether the received digits in said register sender means relate to an acceptable area code.

16. A system as defined in claim 15, wherein said digit analyzing means includes call abandonment means for abandoning a call after a certain time period during the dialing of a call and said area code decoding means includes means for inhibiting said call abandonment means upon detecting digits relating to an acceptable office code.

17. A system as defined in claim 1, wherein said digit analyzing means includes call abandonment means for abandoning a call after a certain time period during the dialing of a call and service code detecting means for inhibiting said call abandonment means upon detection of a dialed service code.

18. A system as defined in claim 1, wherein said digit analyzing means includes call abandonment means for abandoning a call after a certain time period during the dialing of a call and operator code detecting means for inhibiting said call abandonment means upon detection of a dialed call to the operator.

19. A system as defined in claim 1, wherein said register sender means includes a plurality of register senders each including a main memory capable of storing selected data at a plurality of individually addressed storage areas, said control means including scanning means for scanning said register senders with a scanning signal in sequence, each register sender including demand evaluation means responsive to receipt of a scanning signal from said control means for applying a stop signal thereto to stop said scanning means.

20. A system as defined in claim 19, wherein said register sender means further includes first gating means responsive to control from said control means for connecting the storage areas of said main memory to said digit analyzer means in sequence.

21. A system as defined in claim 20, wherein said control means further includes counter means actuated by said stop signal for applying in sequence numerical value signals of increasing value in control of said first gating means.

22. A system as defined in claim 21, wherein said control means further includes third gating means responsive to said counter means reaching a maximum count for automatically actuating said scanning means.

23. A system as defined in claim 11, wherein said storage means in said digit analyzer means includes only three single digit storages, and said digit analyzer further includes steering means responsive to said analyzing means for steering digits received in sequence into said three single digit storages so that digits representing area codes and office codes are inserted in order beginning always with the first single digit storage.

24. A system as defined in claim 23, wherein said digits received in said digit analyzer means from said register sender means are applied to each of said single digit storages through a respective fourth gating means, said steering means including means for generating steering signals capable of enabling selected one of said fourth gating means in an order of said single digit storages required by the digits received.

25. A register sender for an automatic telephone system comprising

- a main memory capable of storing selected data at a plurality of individually addressed storage areas,
- a steering-in counter for sequentially addressing the storage areas of said main memory to store data therein,
- a steering-out counter for sequentially addressing the storage areas of said main memory to read-out data therein,
- a temporary storage for a single digit, and
- transfer means for automatically transferring a digit in said temporary storage to said main memory within a given time after receipt thereof in said temporary storage.

26. A system as defined in claim 25, wherein said transfer means includes means for automatically advancing said steering-in counter subsequent to transfer of a digit to said main memory.

27. A system as defined in claim 25, wherein said register sender means further includes impulse relay means for transmitting impulses through said trunk circuit to said central exchange and actuating means for applying clock pulses to actuate said impulse relay means for the number of times corresponding to a digit stored in said main memory.

28. A system as defined in claim 27, wherein said register sender means further includes an outpulsing counter, and means for pre-setting said outpulsing counter to the complement of a digit stored in said main memory, said actuating means also applying said clock pulses to said outpulsing counter to advance said counter, said outpulsing counter producing an output upon reaching a final count, which output is applied to said actuating means to inhibit further application of clock pulses to said impulse relay means.

29. A system as defined in claim 28, wherein said register sender means further includes means responsive to said outpulsing counter reaching said final count for resetting said outpulsing counter and advancing said steering-out counter after a given delay period.

30. A system as defined in claim 29, wherein said register sender means further includes data detection means for inhibiting said actuating means so long as no data is stored in said main memory.

31. A system as defined in claim 27, wherein said register sender means further includes demand evaluation means for inhibiting said actuating means until the digits stored in said main memory have been analyzed and approved.

32. In a PBX telephone system including at least one trunk circuit extending to a central exchange, a register sender system for controlling the transfer of digits of subscriber data to said central exchange via said trunk circuit comprising register sender means for storing an outpulsing said digits of subscriber data, and digit analyzer means for analyzing the digits stored in said register sender means to determine whether said subscriber data relates to calls which are permitted for the subscriber attempting to establish the call, said register sender means including a main memory capable of storing selected data at a plurality of individually addressed storage areas, a steering-in counter for sequentially addressing the storage areas of said main memory to store data therein, and a steering-out counter for sequentially addressing the storage areas of said main memory to read-out data therein.

33. A system as defined in claim 32, wherein said digit analyzer means includes storage means for storing a plurality of digits received from said register sender means and analyzing means for determining from the digits in said storage means the total number of digits which the register sender means can be expected to receive.

34. A system as defined in claim 33, wherein said register sender means includes second gating means for connecting the output of said steering-in counter representing the number of digits received by the register sender system to said digit analyzer means, said digit analyzer means including comparison means for providing a signal to said digit analyzer means indicating that all digits have been received in response to the output of said steering-in counter corresponding to the output of said analyzing means.

35. A system as defined in claim 34, wherein said digit analyzing means includes office code decoding means for detecting whether the received digits in said register sender means relate to an acceptable office code.

36. A system as defined in claim 35, wherein said digit analyzing means includes call abandonment means for abandoning a call after a certain time period during the dialing of a call and said office code decoding means includes means for inhibiting said call abandonment means upon detecting digits relating to an acceptable office code.

37. A system as defined in claim 34, wherein said digit analyzing means includes area code decoding means for detecting whether the received digits in said register sender means relate to an acceptable area code.

38. A system as defined in claim 37, wherein said digit analyzing means includes call abandonment means for abandoning a call after a certain time period during the dialing of a call and said area code decoding means includes means for inhibiting said call abandonment means upon detecting digits relating to an acceptable office code.

39. A system as defined in claim 34, wherein said digit analyzing means includes call abandonment means for abandoning a call after a certain time period during the dialing of a call and service code detecting means for inhibiting said call abandonment means upon detection of a dialed service code.

40. A system as defined in claim 34, wherein said digit analyzing means includes call abandonment means for abandoning a call after a certain time period during the dialing of a call and operator code detecting means for inhibiting said call abandonment means upon detection of a dialed call to the operator.

41. A system as defined in claim 33, wherein said storage means in said digit analyzer means includes only three single digit storages, and said digit analyzer further includes steering means responsive to said analyzing means for steering digits received in sequence into said three single digit storages so that digits representing area codes and office codes are inserted in order beginning always with the first single digit storage.

42. A system as defined in claim 41, wherein said digits received in said digit analyzer means from said register sender means are applied to each of said single digit storages through a respective fourth gating means, said steering means including means for generating steering signals capable of enabling selected one of said fourth gating means in an order of said single digit storages required by the digits received.

43. A system as defined in claim 34, wherein said register sender means further includes a temporary storage for a single digit and transfer means for automatically transferring the digit in said temporary storage to said main memory within a given time after receipt thereof in said temporary storage.

44. A system as defined in claim 43, wherein said transfer means includes means for automatically advancing said steering-in counter subsequent to transfer of a digit to said main memory.

45. A system as defined in claim 44, wherein said register sender means further includes first gating means responsive to control from said control means for connecting the storage areas of said main memory to said digit analyzer means in sequence.

46. A system as defined in claim 45, wherein said register sender means further includes impulse relay means for transmitting impulses through said trunk circuit to said central exchange and actuating means for applying clock pulses to actuate said impulse relay means for the number of times corresponding to a digit stored in said main memory.

47. A system as defined in claim 46, wherein said register sender means further includes an outpulsing counter, and means for pre-setting said outpulsing counter to the complement of a digit stored in said main memory, said actuating means also applying said clock pulses to said outpulsing counter to advance said counter, said outpulsing counter producing an output upon reaching a final count, which output is applied to said actuating means to inhibit further application of clock pulses to said impulse relay means.

48. A system as defined in claim 47, wherein said register sender means further includes means responsive to said outpulsing counter reaching said final count for resetting said outpulsing counter and advancing said steering-out counter after a given delay period.

49. A system as defined in claim 46, wherein said register sender means further includes data detection means for inhibiting said actuating means so long as no data is stored in said main memory.

50. A system as defined in claim 46, wherein said register sender means further includes demand evaluation means responsive to said digit analyzer means for inhibiting said actuating means until the digits stored in said main memory have been analyzed and approved by said digit analyzer means.

51. In a PBX telephone system including at least one trunk circuit extending to a central exchange, a register sender system for controlling the transfer of digits of subscriber data to said central exchange via said trunk circuit comprising register sender means for storing and outpulsing said digits of subscriber data, including at least one register sender having a main memory capable of storing selected data at a plurality of individually addressed storage areas, digit analyzer means for analyzing the digits stored in said register sender means to determine whether said subscriber data relates to calls which are permitted for the subscriber attempting to establish the call, and control means responsive to the receipt and storage of subscriber data in said register sender means for connecting said digit analyzer means to said register sender means, said register sender further including a temporary stroage for a single digit and transfer means for automatically transferring the digit in said temporary storage to said main memory within a given time after receipt thereof in said temporary storage.

52. A system as defined in claim 51, wherein said register sender means includes a plurality of register senders each including a main memory capable of storing selected data at a plurality of individually addressed storage areas, said control means including scanning means for scanning said register senders with a scanning signal in sequence, each register sender including demand evaluation means responsive to receipt of a scanning signal from said control means for applying a stop signal thereto to stop said scanning means.

53. A system as defined in claim 52, wherein said register senders each include means for inhibiting said demand evaluation means from generating said stop signal so long as said transfer means is operating to transfer data into said main memory.

54. A system as defined in claim 52, wherein said register senders each further include means for connecting said main memory of a given register to said digit analyzer means.

55. A system as defined in claim 54, wherein said control means further includes counter means actuated by said stop signal for applying in sequence numerical value signals of increasing value in control of said first gating means.

56. A system as defined in claim 55, wherein said control means further includes third gating means responsive to said counter means reaching a maximum count for automatically actuating said scanning means.

57. A system as defined in claim 51, wherein said register senders each further include means for continuously clearing the main memory thereof so long as the particular register sender is not connected to a trunk circuit.

* * * * *

UNITED STATES PATENT OFFICE
CERTIFICATE OF CORRECTION

PATENT NO. : 3,671,677

DATED : June 20, 1972

INVENTOR(S) : Ernest O. Lee, Jr. and John A. Adams, Jr.

It is certified that error appears in the above-identified patent and that said Letters Patent are hereby corrected as shown below:

| | |
|---|---|
| Col. 3, line 26 | After "program" first occurrence insert ---control---. |
| Col 6, line 22 | delete "code) lead" and insert ---releases---. |
| Col. 12, line 68 | "X-X" should be ---X-Y---. |
| Col 21, line 49 | delete line over "RDD". |
| line 50 | add line over "RDD". |

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*